United States Patent
Moroo et al.

(10) Patent No.: US 8,520,264 B2
(45) Date of Patent: Aug. 27, 2013

(54) INFORMATION EMBEDDING METHOD, INFORMATION OBTAINING METHOD AND APPARATUS

(75) Inventors: Jun Moroo, Kawasaki (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 1176 days.

(21) Appl. No.: 12/007,365

(22) Filed: Jan. 9, 2008

(65) Prior Publication Data
US 2008/0212141 A1 Sep. 4, 2008

(30) Foreign Application Priority Data
Jan. 15, 2007 (JP) ................... 2007-006226

(51) Int. Cl.
*H04N 1/40* (2006.01)

(52) U.S. Cl.
USPC ......... 358/3.28; 358/1.9; 358/1.16; 358/3.26; 382/100; 283/113

(58) Field of Classification Search
USPC .................. 358/1.9, 3.24–3.28; 382/100
See application file for complete search history.

(56) References Cited

U.S. PATENT DOCUMENTS

| | | | | |
|---|---|---|---|---|
| 5,630,026 A * | 5/1997 | Ogletree et al. | ............... | 358/1.7 |
| 6,181,802 B1 * | 1/2001 | Todd | ............... | 382/100 |
| 6,442,284 B1 * | 8/2002 | Gustafson et al. | ............ | 382/100 |
| 6,665,417 B1 * | 12/2003 | Yoshiura et al. | .............. | 382/100 |
| 7,006,257 B1 * | 2/2006 | Yamazaki et al. | ............ | 358/3.28 |
| 7,006,663 B2 * | 2/2006 | Acharya et al. | ................ | 382/100 |
| 7,085,418 B2 * | 8/2006 | Kaneko et al. | ................ | 382/219 |
| 7,280,701 B2 * | 10/2007 | Moroo et al. | ................. | 382/239 |
| 2004/0234139 A1 * | 11/2004 | Moroo et al. | ................. | 382/232 |
| 2006/0204032 A1 * | 9/2006 | Nakamura et al. | ............ | 382/100 |

FOREIGN PATENT DOCUMENTS

| | | |
|---|---|---|
| EP | 1 480 163 | 11/2004 |
| JP | 2002-135736 | 5/2002 |
| JP | 2004-349879 | 12/2004 |

OTHER PUBLICATIONS

Chinese Office Action issued Feb. 12, 2010 in corresponding Chinese Patent Application 200710160012.0.
Extended European Search Report, mailed Apr. 22, 2008 and issued in corresponding European Patent Application No. 07123079.1-1228.

* cited by examiner

*Primary Examiner* — Richard Zhu
(74) *Attorney, Agent, or Firm* — Staas & Halsey LLP

(57) ABSTRACT

According to an aspect of an embodiment, a method of embedding information into an image comprises dividing the image into a plurality of blocks, providing a plurality of embedded blocks corresponding to the plurality of blocks, respectively, each of the embedded blocks having the same size as each of the blocks when each of the blocks is smaller than a predetermined size, each of the embedded blocks having the predetermined size and being placed at the center of each the block when each of the blocks is not smaller than the predetermined size and selectively modifying the characteristic value of each of the embedded blocks in accordance with the information to be embedded.

17 Claims, 23 Drawing Sheets

Fig. 7

I3 Image coding data

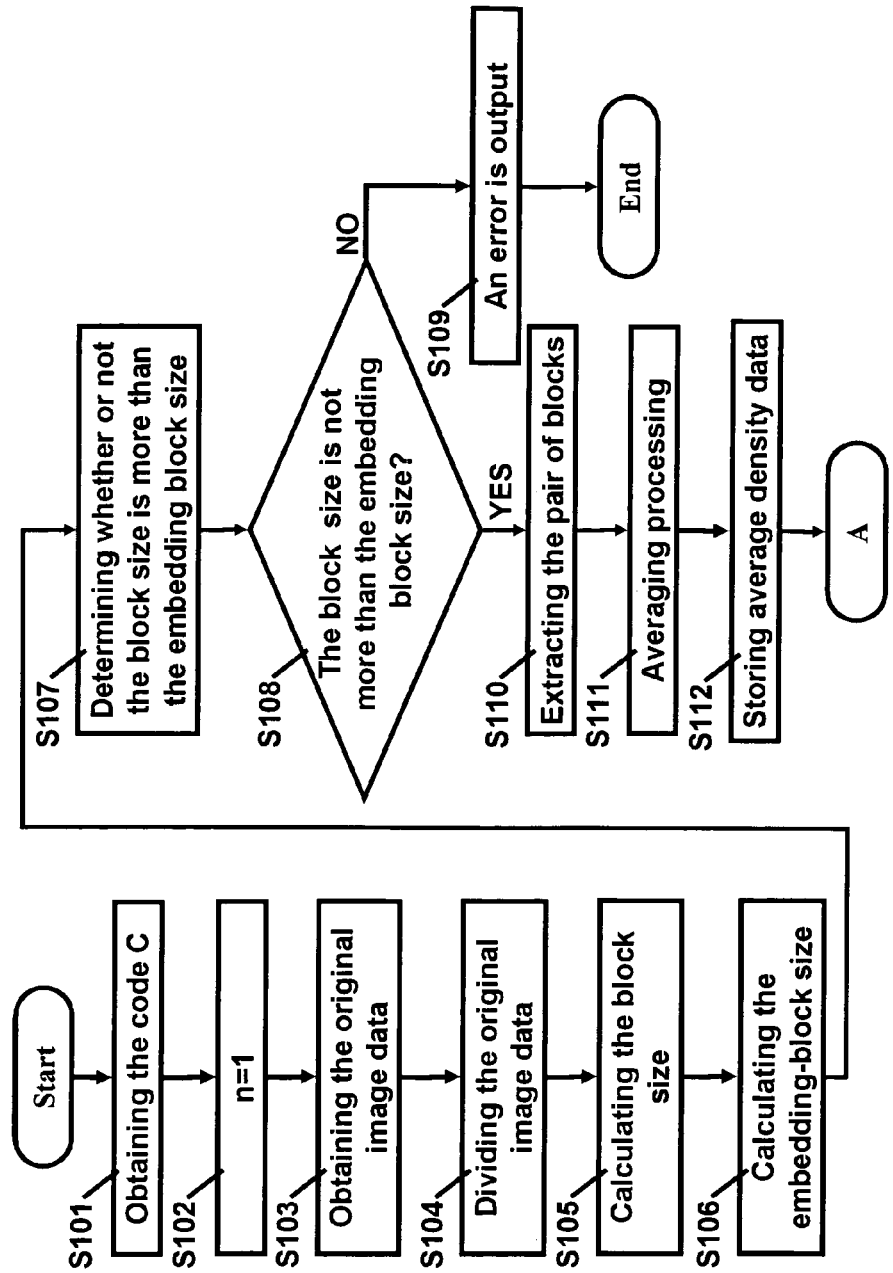

Fig. 9

(A) In the case of $D_{lxy} < D_{rxy}$ $$D'_{lxy} = (D_{lxy} + D_{rxy})/2 - T/2 \cdots (1)$$
$$D'_{rxy} = (D_{lxy} + D_{rxy})/2 + T/2 \cdots (2)$$

(B) In the case of $D_{lxy} \geqq D_{rxy}$ $$D'_{lxy} = (D_{lxy} + D_{rxy})/2 + T/2 \cdots (3)$$
$$D'_{rxy} = (D_{lxy} + D_{rxy})/2 - T/2 \cdots (4)$$

$D'_{lxy}$    The left average density data after the change
$D'_{rxy}$    The right average density data after the change
$D_{lxy}$     The left average density data before the change
$D_{rxy}$     The right average density data before the change
$T$           The difference provided each blocks

INFORMATION EMBEDDING METHOD, INFORMATION OBTAINING METHOD AND APPARATUS

BACKGROUND OF THE INVENTION

1. Field of the Invention

The present invention relates to an image processing apparatus that embeds information to an image, and more particularly, to an image processing apparatus, an image processing program, and a printing matter to which information is embedded with the image processing apparatus, in which image deterioration can be prevented upon embedding code to large image data.

2. Description of the Related Art

A technology described in Japanese Unexamined Patent Application Publication No. 2004-349879 is available as an example of the related art.

SUMMARY

According to an aspect of an embodiment, a method of embedding information into an image comprises dividing the image into a plurality of blocks, providing a plurality of embedded blocks corresponding to the plurality of blocks, respectively, each of the embedded blocks having the same size as each of the blocks when each of the blocks is smaller than a predetermined size, each of the embedded blocks having the predetermined size and being placed at the center of each the block when each of the blocks is not smaller than the predetermined size and selectively modifying the characteristic value of each of the embedded blocks in accordance with the information to be embedded.

BRIEF DESCRIPTION OF THE DRAWINGS

FIG. 7 is a diagram showing an example of image-coding data.

FIGS. 8A and 8B are flowcharts showing a processing sequence of the encoder according to the first embodiment.

FIG. 9 is a diagram for complementing density changing processing.

DESCRIPTION OF THE PREFERRED EMBODIMENTS

A technology for embedding, to image data and audio data, another data (code) is applied to prevent the forgery, prevent the illegal use, and present additional service.

However, the above-mentioned technology has a problem that the code is embedded to image data with a large size and then the image quality greatly deteriorates.

Figure 20:
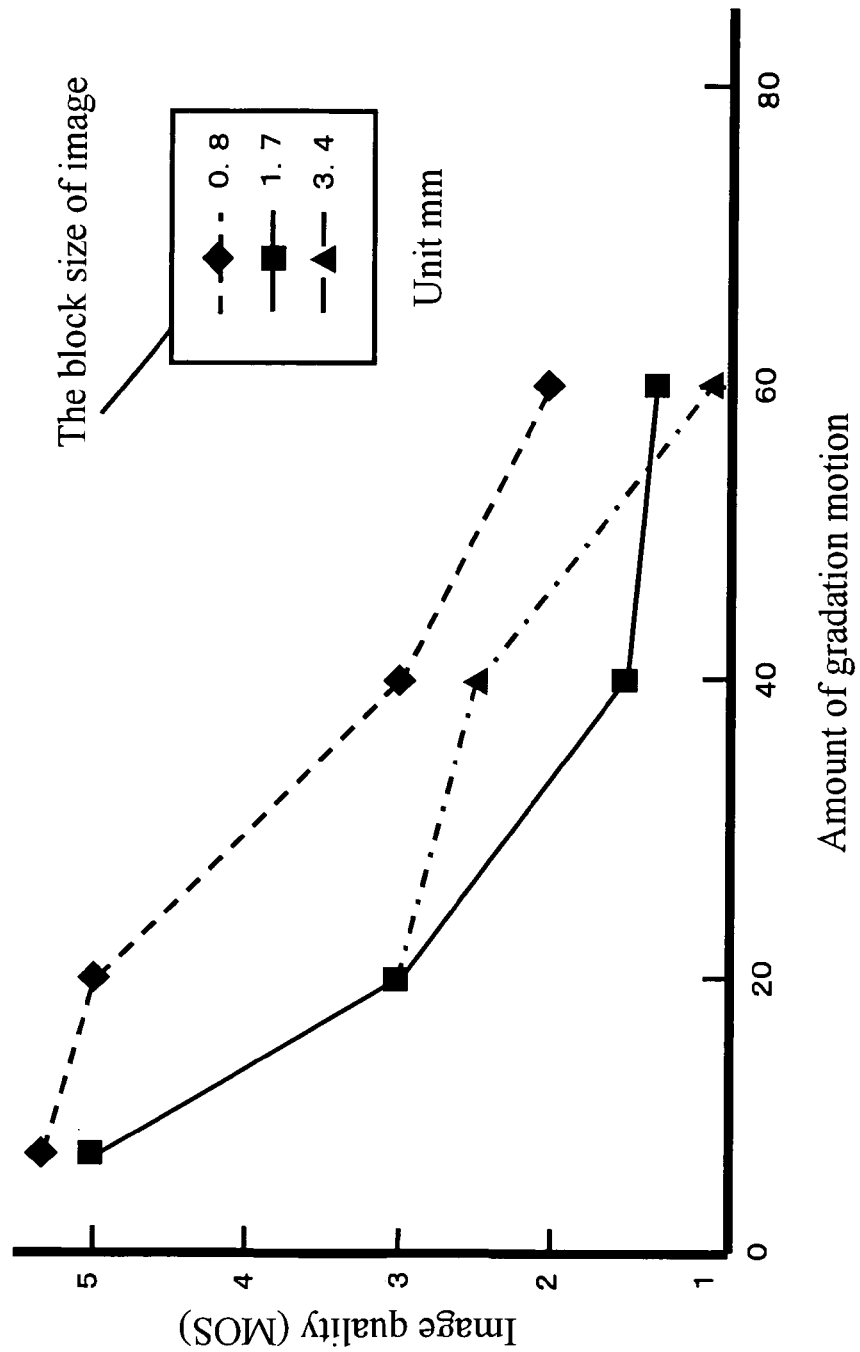
FIG. 20 is a diagram showing a relationship between the amount of gradation motion and the image quality with image sizes.

FIG. 20 is a diagram showing a relationship between the amount of gradation motion and the image quality with image sizes. Referring to FIG. 20, the ordinate shows the image quality. An image quality 5 is a high image quality and the image quality deteriorates in order of image qualities 4, 3, 2, and 1. An image quality 3.5 is limitation of the image quality allowable the human being. The amount of gradation motion as the abscissa shows the size for changing the shading of the image data.

Referring to FIG. 20, as the image size is larger, obviously, the image deterioration due to the change in amount of gradation motion is large. For example, when the amount of gradation motion is 30, if the size of block is 0.8 mm in square, the image quality is 3.5. If the size of block is 1.7 mm in square, even with the same amount of gradation motion, the image quality is 2.1 and this is over the allowable range of image deterioration.

Hereinbelow, a specific structure will be given of an image processing apparatus, a printing matter, and an image processing program according to preferred embodiments with reference to the drawings.

Figure 1:
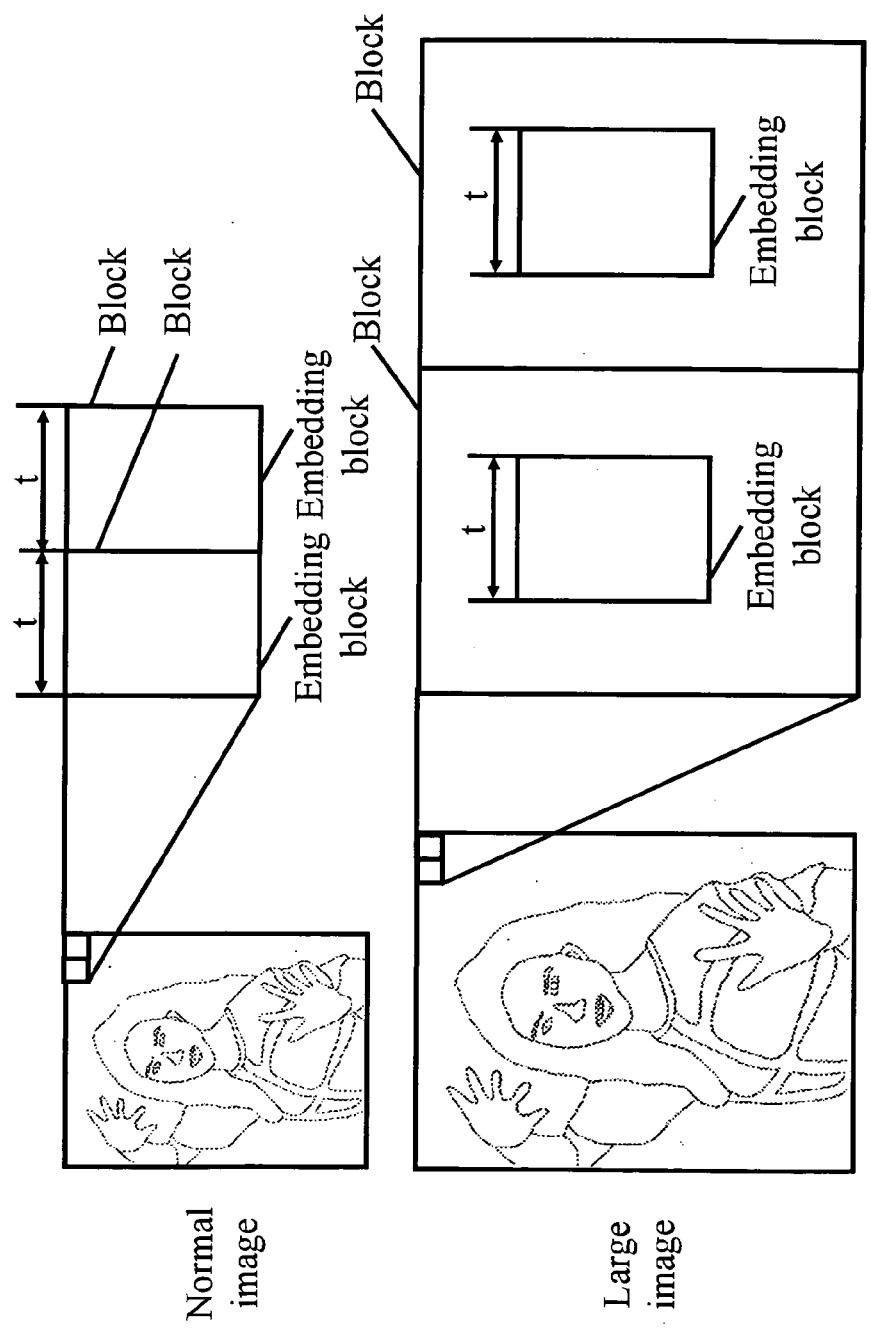
FIG. 1 is an explanatory diagram for illustrating the outline and feature of an encoder according to the first embodiment.

First Embodiment:

First, a description will be given of the outline and features of an encoder according to the first embodiment. FIG. 1 is an explanatory diagram for illustrating the outline and features of the encoder according to the first embodiment. Referring to FIG. 1, the encoder according to the first embodiment divides original image data (image data before embedding code) into a plurality of blocks. And the encoder calculates the size of a region (t in square in the example shown in FIG. 1) of a region (hereinafter, expressed as an embedding block) for operating the amount of characteristics in a pair of blocks (two adjacent blocks) on the basis of the size of the original image data (including the resolution of the original image). And the encoder embeds the code to the original image data depending on the calculated size of the embedding block.

For example, as shown on the top of FIG. 1, the code is embedded to a normal image by operating the amount of characteristics of all regions in the pair of blocks when the block is equal to the embedding block. One code is embedded to one pair of blocks. On the other hand, as shown on the bottom of FIG. 1, in the case of a large image, the code is embedded by operating the amount of characteristics of the embedding block in the pair of blocks when the embedding block is smaller than the block.

As mentioned above, with the encoder according to the first embodiment, the code is embedded to the original image data with the size of the embedding block calculated by the image size, irrespective of the size of the block upon dividing the original image data. Therefore, even in the case of embedding the code to large image data, the image deterioration can be greatly suppressed.

Figure 2:
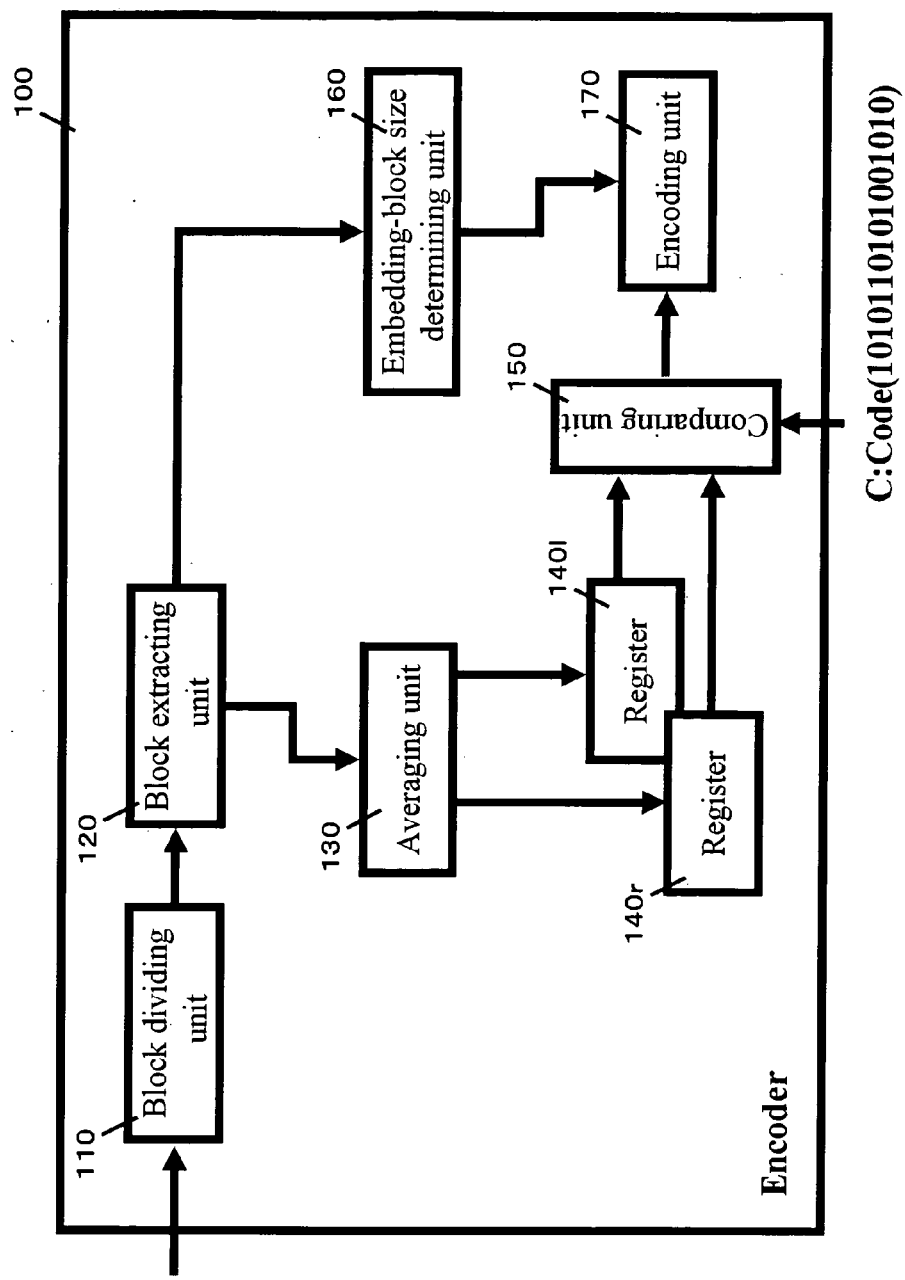
FIG. 2 is a functional block diagram showing the structure of the encoder according to the first embodiment.

Next, the structure of the encoder according to the first embodiment will be described. FIG. 2 is a functional block diagram showing the structure of an encoder 100 according to the first embodiment. Referring to FIG. 2, the encoder 100 comprises: a block dividing unit 110; a block extracting unit 120; an averaging unit 130; registers 140r and 140l; a comparing unit 150; an embedding-block size determining unit 160; and an encoding unit 170.

Figure 5:
FIG. 5 is a diagram showing an example of code C embedded to the original image data.
Figure 3:
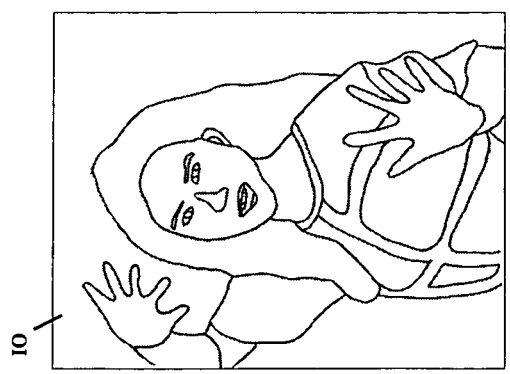
FIG. 3 is a diagram showing an example of original image data.
Figure 4:
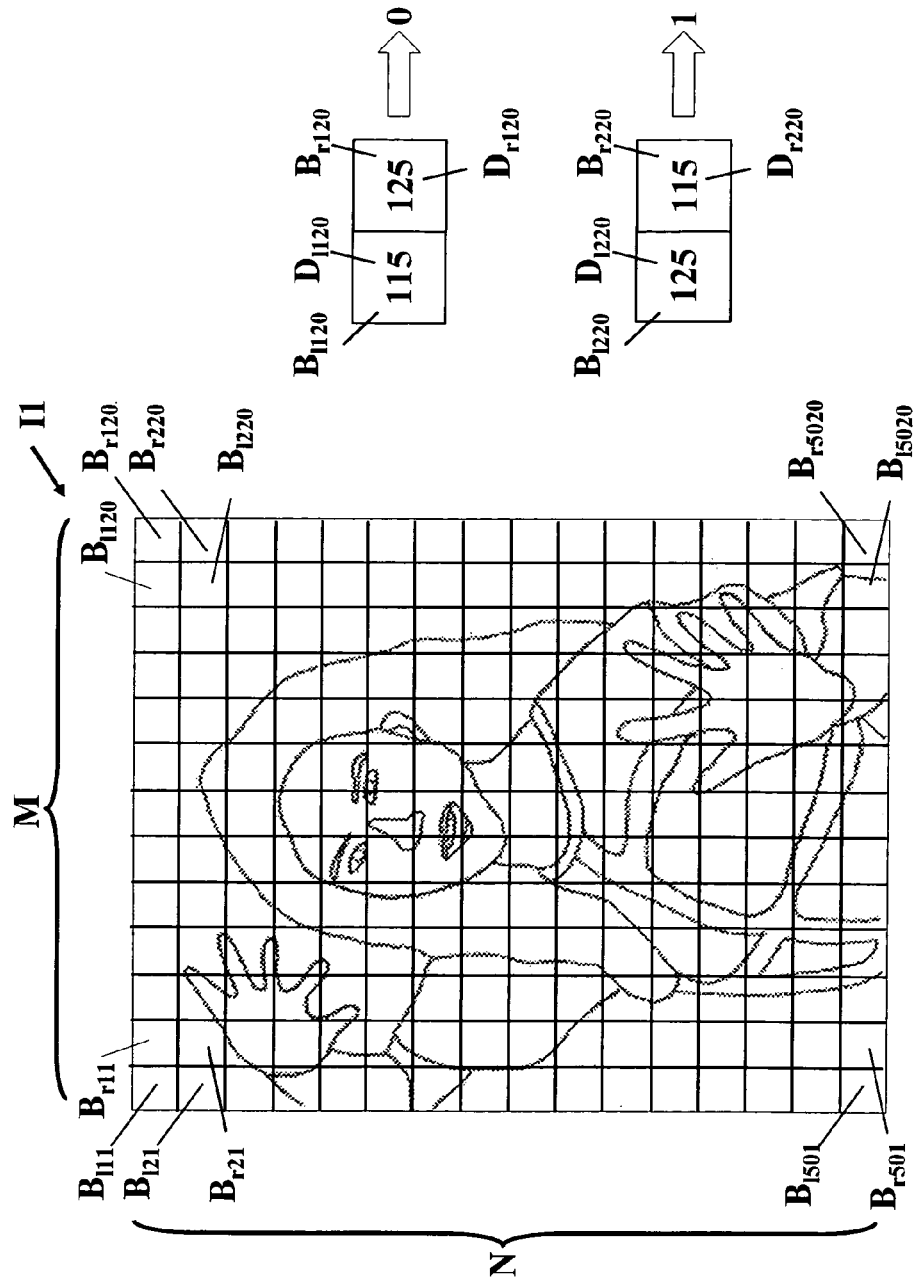
FIG. 4 is a diagram showing an example of block-divided image data.

The block dividing unit 110 is a processing unit that divides input original data into N rows×M columns blocks. The block dividing unit 110 divides the data into 50 rows and 40 columns as an example according to the first embodiment. And the block dividing unit 110 outputs the divided data as block-divided image data. FIG. 3 is a diagram showing an example of the original data. FIG. 4 is a diagram showing an example of the block-divided image data. FIG. 5 is a diagram showing an example of code C embedded to the original data.

The original image data I0 is image data generated on the basis of a predetermined image format. And the original image data I0 is image data with the size of 720 pixels×900 pixels as an example according to the first embodiment. Incidentally, the image format of the original image data I0 needs to have resolution information, such as a BMP (Bit Map) format and a TIFF (Tagged Image File Format) format. The code C shown in FIG. 5 is embedded to the original image data I0.

Block-divided image data I1 comprises 2000 (50 rows×40 columns) blocks, e.g., block $B_{l11}$, $B_{r11}$, ..., $B_{l120}$, $B_{r120}$, ..., $B_{l21}$, $B_{r21}$, ..., $B_{l5020}$, $B_{r5020}$. Then, with respect to the block-divided image data I1, code with one bit is embedded to a pair of blocks. The pair of blocks is comprised of two adjacent blocks.

Specifically, a pair of blocks individually comprises two blocks, e.g., the blocks $B_{l11}$ and $B_{r11}$, the blocks $B_{l12}$ and $B_{r12}$, ..., the blocks $B_{l12}$ and $B_{r21}$, ..., the blocks $B_{l12}$ and $B_{r21}$, the blocks $B_{l1501}$ and $B_{r501}$, ..., the blocks $B_{l5020}$ and $B_{r5020}$.

Herein, with respect to one $B_{lxy}$ of the pair blocks, a suffix l (left) denotes the left block in the pair of blocks. A suffix x denotes a row (N). A suffix y denotes a column (M). On the other hand, with respect to the other $B_{rxy}$, a suffix r (right) denotes the right block in the pair of blocks. A suffix x denotes a row (N). A suffix y denotes a column (M).

Further, with respect to the pair of blocks, as the amount of characteristics of the left block $B_{lxy}$, average density is designated by left average density data $D_l$. The average density is average gradation of the images in the blocks. As the amount of characteristics of the right block $B_{rxy}$, average density is designated by right average density data $D_r$. The average density is the amount of characteristics.

Herein, as shown by the following relational expression, when the left average density data $D_l$ is less than the right average density data $D_r$, the pair of blocks indicates "0" as code corresponding to one bit. When the left average density data $D_l$ is not less than the right average density data $D_r$, the pair block indicates "1" as code corresponding to one bit.

$D_l < D_r \rightarrow$ "0"

$D_l \geq D_r \rightarrow$ "1"

For example, the pair of blocks comprising the blocks $B_{l120}$ and $B_{r120}$ shown in FIG. 4 has the left average density data $D_{l120}$ as "115" and the left average density data $D_{r120}$ as "125". And "0" is therefore expressed as the code corresponding to one bit.

Further, regarding the pair of blocks comprising the blocks $B_{l220}$ and $B_{r220}$, the left average density data $D_{l220}$ is "125", the right average density data $D_{r220}$ is "115". And "1" is therefore expressed as the code corresponding to one bit.

Further, the block-divided image data I1 comprises 20 pair blocks (40 blocks) per row, and therefore shows the code corresponding to 20 bits. As a consequence, the block-divided image data I1 shows the code corresponding to 1000 bits for all rows (50 rows).

Back to the description with reference to FIG. 2, the block extracting unit 120 sequentially extracts the pair of blocks ($B_{lxy}$ and $B_{rxy}$) from the block-divided image data I1 (refer to FIG. 4) in accordance with the bit shift of the code C. And the block extracting unit 120 sequentially outputs the density distribution of the blocks ($B_{lxy}$ and $B_{rxy}$) as block density data D.

Herein, the bit shift of the code C indicates that a pointer (not shown) of the bit shifts to the right by one bit from the leftmost bit (1) shown in FIG. 5 to the right bit (0).

Further, the block extracting unit 120 calculates the block size of the block-divided image data I1. And the block extracting unit 120 sends the calculation result, as block size data, to the embedding-block size determining unit 160. If the size of the original image data I0 is 720 pixels in width×900 pixels in height and the original image data I0 is divided into 40 blocks in width and 50 blocks in height, as shown in FIG. 4, the size of block in width is 18 pixels (720/40) and the size of block in height is 18 pixels (900/50).

The averaging unit 130 obtains the left average density data $D_l$ corresponding to the block $B_{lxy}$ and the right average density data $D_r$ corresponding to the block $B_{rxy}$ from the block density data D. And the averaging unit 130 sequentially stores the obtained result to the resisters 140l and 140r in accordance with the bit shift of the code C.

The comparing unit 150 compares an n-th bit of the code C with the bit determination result, determined on the basis of the size relationship between the left average density data $D_l$ and the right average density data $D_r$ stored in the registers 140l and 140r. And n is 1, 2, ..., 16 from the leftmost bit shown in FIG. 5. The bit determination result is determined as "0" or "1" on the basis of the above-mentioned relational expression in FIG. 4

The embedding-block size determining unit 160 is a processing unit that calculates the size of the embedding block on the basis of the resolution and the embedding size of the original image data I0. For example, the resolution and the embedding size of original data I0 is respectively 300 dpi and 0.8 mm in square. The size of embedding block on the printing matter has the printed image and the embedding size can be arbitrarily changed by a user. Then, the size of the embedding block is 9.44 pixels in height and 9.44 pixels in width (0.8×300/25.4≈9.44). The embedding-block size determining unit 160 provides a plurality of embedded blocks corresponding to the plurality of blocks.

Further, the embedding-block size determining unit 160 compares the block size data obtained from the block extracting unit 120 with the size of the embedding block. And the embedding-block size determining unit 160 determines whether or not the size of the block of the block-divided image data I1 is more than the size of the embedding block.

If the size of the block is more than the size of the embedding block, the embedding-block size determining unit 160 sends information on the size of the embedding block, as data on the size of the embedding block, to the encoding unit 170.

If the size of the block is not more than the size of the embedding block, the embedding-block size determining unit 160 outputs an error. In this case, the processing for embedding the code to the original image data I0 ends. In the example according to the first embodiment, since the block size is 18 pixels×18 pixels and the size of the embedding block is 9.44 pixels×9.44 pixels, the embedding processing is sequentially executed.

The encoding unit 170 executes processing for embedding the code to the block-divided image data I1 on the basis of the comparison result of the comparing unit 150. The block-divided image data I1 is the original image data I0. Specifically, when the comparison result of the comparing unit 150 indicates matching, the encoding unit 170 keeps the size relationship between the left average density data $D_l$ and the right average density data $D_r$.

On the other hand, when the comparison result of the comparing unit 150 indicates unmatching, the encoding unit 170 operates the amount of the left average density data $D_l$ and the right average density data $D_r$, thereby inversing the size relationship.

Figure 6:
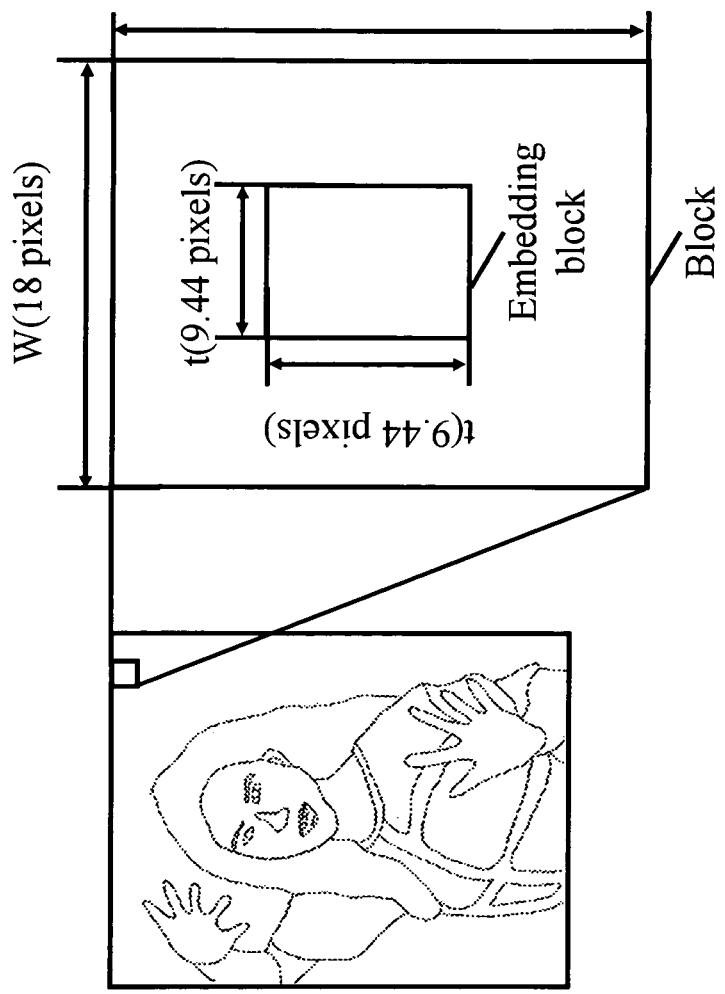
FIG. 6 is a diagram for illustrating processing of an encoding unit.

Incidentally, the encoding unit 170 does not operate the entire amount of characteristics in the block but operates the amount of characteristics of a region specified by the data on the embedding block size obtained from the embedding-block size determining unit 160. FIG. 6 is a diagram for illustrating the processing of the encoding unit 170. As shown in FIG. 6, although the block size is 18 pixels×18 pixels, the region for operating the amount of characteristics of the encoding unit 170 is 9.44 pixels×9.44 pixels of the size of the embedding block.

Figure 7:
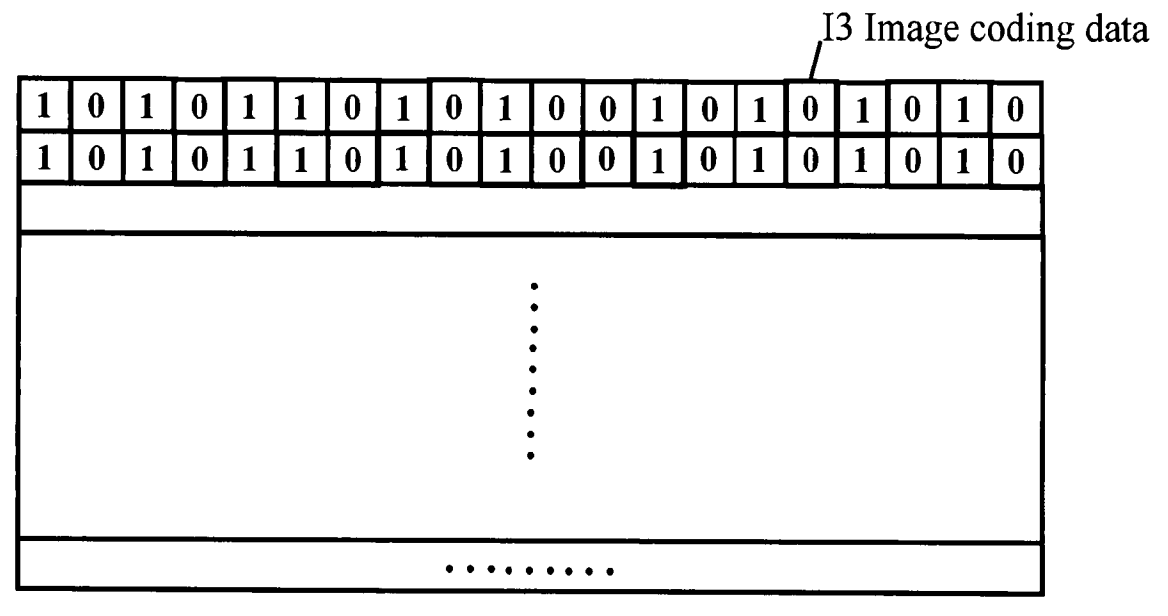

The encoding unit 170 executes the above processing, generates image-coding data having the code embedded to the block-divided image data I1, and outputs the generated image-coding data. FIG. 7 is a diagram showing an example of the image-coding data. Image-coding data I3 shown in FIG. 7 corresponds to the block-divided image data I1 (refer to FIG. 4) and the original image data I0 (refer to FIG. 3). Since the block-divided image data I1 has 1000 (20×50) pairs of blocks, the code having 16 bits is embedded approximately 62 times.

Referring to FIG. 7, the embedding state of the code C is shown, the actual image-coding data I3 however corresponds to image data similar to the original image data I0. Although there is a block having partly-changed density, this is not viewed by the naked eye. Further, the components in the encoder 100 are mutually connected via a control unit (not shown).

Figure 8B:
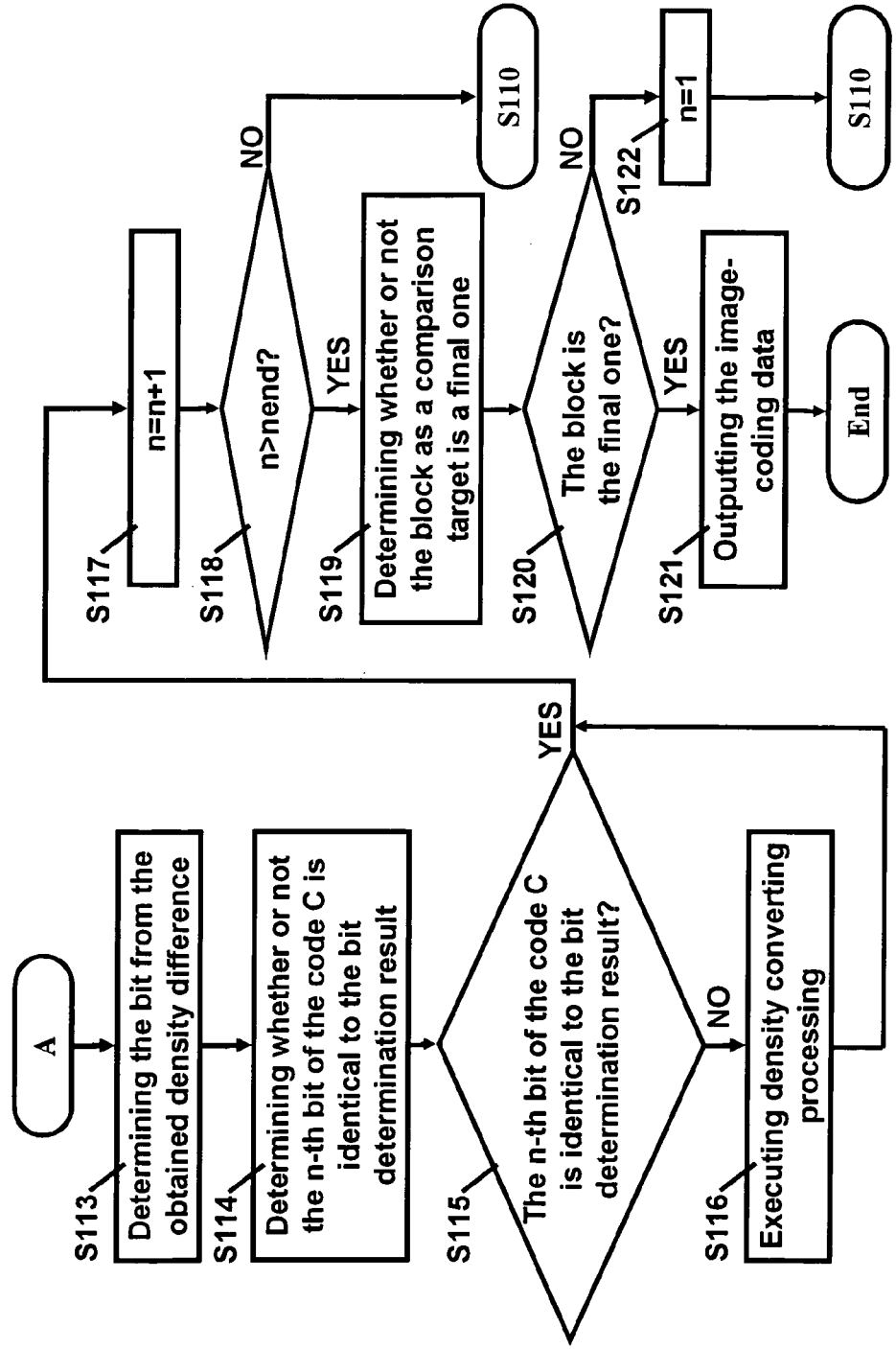

Next, a description will be given of processing of the encoder 100 according to the first embodiment. FIGS. 8A and 8B are flowcharts showing a processing routine of the encoder 100 according to the first embodiment. Referring to FIGS. 8A and 8B, with the encoder 100, the comparing unit 150 obtains the code C (refer to FIG. 5) (in step S101). And the comparing unit 150 sets n to 1 as the initial value (in step S102). Reference numeral n in step S102 denotes the pointer of the bit of the code C. In this case, n=1 corresponds to "1" at the leftmost bit of the code C.

Subsequently, the block dividing unit 110 obtains the original image data I0 (refer to FIG. 3) (in step S103). And the block dividing unit 110 divides the original image data I0 input by the block division processing (in step S104). According to the first embodiment, the block dividing unit 110 generates the block-divided image data I1 obtained by dividing the original image data I0 into 50×40 blocks.

Further, the block dividing unit 110 sends the block-divided image data I1 to the block extracting unit 120. And the block extracting unit 120 calculates the block size and sends the calculated block size, as the block size data, to the embedding-block size determining unit 160 (in step S105). If the size of the original image data I0 is 720 pixels in width×900 pixels in height and the original image data I0 is divided into 40 blocks in width and 50 blocks in height as shown in FIG. 4, the block size in width is 18 pixels (720/40) and the block size in height is 18 pixels (900/50).

Subsequently, the embedding-block size determining unit 160 calculates the embedding block size (in step S106). The embedding block size is the size of the embedding block. If the resolution of the original image data I0 is 300 dpi and the embedding size is 0.8 mm in square, the size of the embedding block is 9.44 pixels in height and 9.44 pixels in width (0.8×300/25.4≈9.44).

Further, the embedding-block size determining unit 160 determines whether or not the block size is more than the embedding block size (in step S107). The block size is a size of the block. If the block size is not more than the embedding block size (No in step S108), an error is output (in step S109) and the processing ends. Each of the embedded blocks has the predetermined size and is placed at the center of each block when each the block is not smaller than the predetermined size.

On the other hand, if the block size is more than the embedding block size (Yes in step S108), processing after step S110 is sequentially executed.

The block extracting unit 120 extracts the pair of blocks corresponding to n from the block-divided image data I1. And n equals 1 in the case of first sequence. In this case the pair of blocks is comprised of the blocks $B_{l11}$ and $B_{r11}$. Thereafter, the density distributions of the blocks $B_{l11}$ and $B_{r11}$ are set as the block density data D and the data is output to the averaging unit 130 (in step S110).

The averaging unit 130 obtains the left average density data $D_{l11}$ corresponding to the block $B_{l11}$ and the right average density data $D_{r11}$ corresponding to the block $B_{r11}$ from the block density data D with averaging processing in the case of first sequence (in step S111). And the averaging unit 130 stores the left average density data $D_{l11}$ and the right average density data $D_{r11}$ to the resisters 140*l* and 140*r*, respectively (in step S112).

The comparing unit 150 obtains "1" as the leftmost bit of the code C shown in FIG. 5. The first sequence corresponds to n=1. And the comparing unit 150 obtains the density difference between the left average density data $D_{l11}$ and the right average density data $D_{r11}$ stored in the resisters 140*l* and 140*r*. The comparing unit 150 determines the bit from the obtained density difference (in step S113). And the comparing unit 150 determines whether or not the n-th bit of the code C is identical to the bit determination result (in step S114).

If the b-th bit of the code C is not identical to the bit determination result (No in step S115), the encoding unit 170 executes the density converting processing (in step S116). The encoding unit 170 executes density converting processing for changing the left average density data $D_{lxy}$ and the right average density data $D_{rxy}$ so that the bit determination result based on the size relationship between the left average density data $D_{lxy}$ and the right average density data $D_{rxy}$ is identical to the n-th bit of the code C. Incidentally, the region as the density converting target becomes a region of the embedding block calculated the embedding-block size determining unit 160. The density converting processing is a processing for inversing the size relationship between the left average density data $D_{lxy}$ and the right average density data $D_{rxy}$.

FIG. 9 is a diagram for complementing the density changing processing. In the case of $D_{lxy}<D_{rxy}$, the encoding unit 170 obtains the left average density data $D'_{lxy}$ after the change from (1) expression. Thereafter, the encoding unit 170 obtains the right average density data $D'_{rxy}$ after the change from (2) expression. Thus, after the change, the left average density data $D'_{lxy}$ is less than $D'_{rxy}$, and the bit determination result is changed from "1" to "0".

On the other hand, if $D_{lxy} \geqq D_{rxy}$, the encoding unit 170 obtains the left average density data $D'_{lxy}$ after the change from (3) expression. Thereafter, the encoding unit 170 obtains the right average density data $D'_{rxy}$ after the change. As a consequence, the left average density data $D'_{lxy}$ is not less than $D'_{rxy}$ and the bit is determined from "0" to "1".

Referring back to the flowchart of FIGS. 8A and 8B, if the n-th bit of the code is identical to the bit determination result (Yes in step S115), the comparing unit 150 increments n by 1 (in step S117) and determines whether or not n is more than nend. And nend is 16 according to the first embodiment.

If n is not more than nend (No in step S118), the processing shifts to step Silo. If n is more than nend (Yes in step S118), the comparing unit 150 determines whether or not the block as a comparison target is a final one (in step S119). If the block is the final one (Yes in step S120), the encoding unit 170 outputs the image-coding data I3 (in step S121). On the other hand, if the block is not the final one, the comparing unit 150 sets n as 1 (in step S122) and the processing shifts to step S110.

As mentioned above, the embedding-block size determining unit 160 calculates the size of the embedding block. And the encoding unit 170 operates the amount of characteristics of the region with the size of the embedding block, thereby embedding the code. Therefore, even if the code is embedded to the original image data I0 with a large size, the deterioration of the original image data can be suppressed.

As mentioned above, with the encoder 100 according to the first embodiment, the block dividing unit 110 divides the original image data I0 into a plurality of blocks. And the embedding-block size determining unit 160 calculates the size of the embedding block on the basis of the resolution and the embedding size of the original image data. Further, when the encoding unit 170 embeds the code to the original image data I0, the amount of characteristics of all regions in the block is not operated but the amount of characteristics of the size of the embedding block is operated, thereby embedding the code. And the original image data I0 is block-divided image data I1. Therefore, the code can be embedded without deteriorating the image quality of the original image data.

Further, with the encoder 100 according to the first embodiment, the embedding-block size determining unit 160 compares the block size with the size of the embedding block. If the block size is not more than the size of the embedding block, the code embedding to the original image data I0 stops. Therefore, it is possible to prevent the erroneous code-embedding to the original image data I0 with small size that cannot be decoded.

Figure 10:
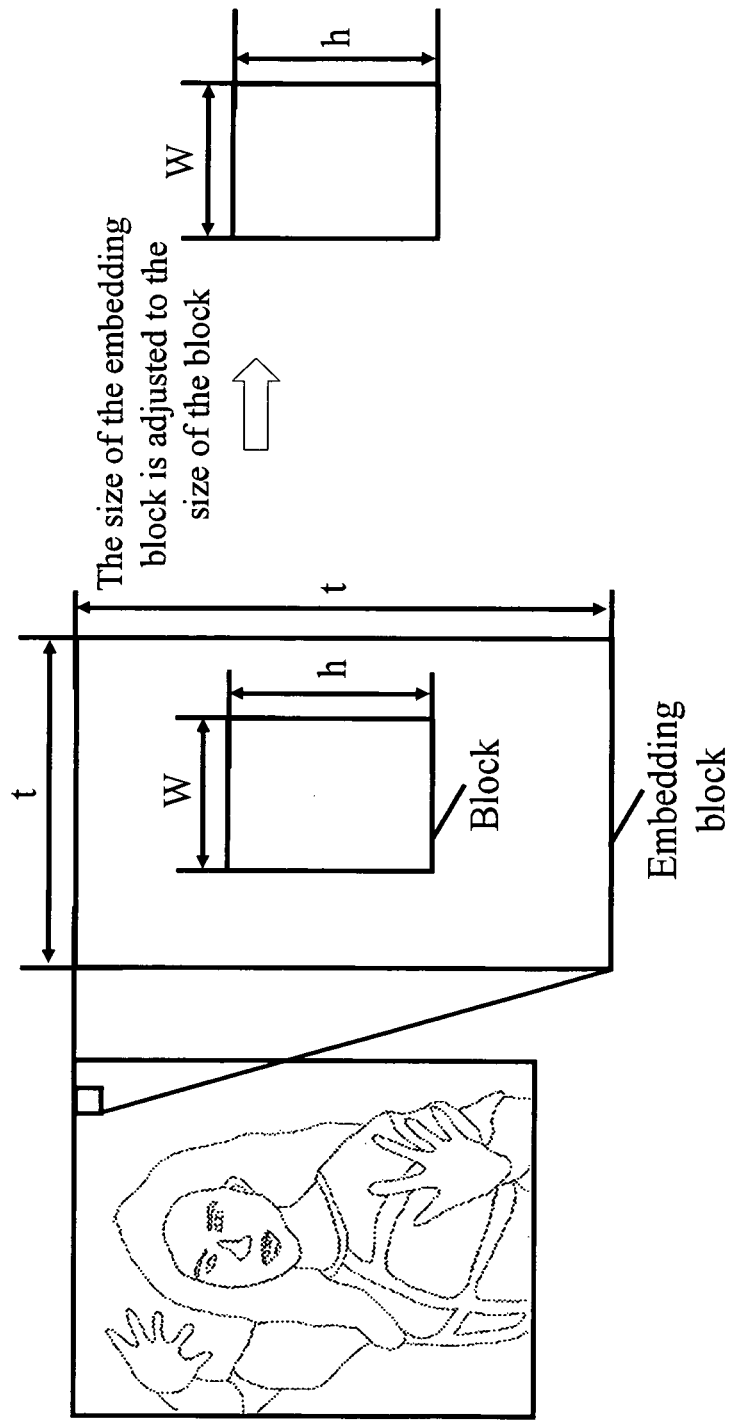
FIG. 10 is an explanatory diagram for illustrating the outline and feature of an encoder according to the second embodiment.

Second Embodiment:

Next, a description will be given of the outline and feature of an encoder according to the second embodiment. FIG. 10 is an explanatory diagram for illustrating the outline and feature of the encoder according to the second embodiment.

As shown in FIG. 10, with the encoder according to the second embodiment, the size of the block and the size of the embedding block are calculated with the same method as that of the encoder 100 according to the first embodiment and the size of the block is compared with the size of the embedding block. As a consequence, if the size of the block is not more than the size of the embedding block, the size of the embedding block is adjusted to the size of the block, thereby executing the code embedding to the original image data.

In the example shown in FIG. 10, the size of the embedding block is t in square and the size of the block upon dividing the original image data is w (w<t) in width and h (h<t) in height. Therefore, with the encoder according to the second embodiment, the size of the embedding block is adjusted to w in width and h in height, and the code is embedded with the size of the embedding block after the adjustment. And the size of the embedding block is the size of the block. The amount of characteristics is operated.

As mentioned above, with the encoder according to the second embodiment, even if the size of the block is not more than the size of the embedding block, the size of the embedding block is adjusted and the embedding to the original image data is executed. Similarly to the large image, the code can be embedded even to the original image with a small size.

Figure 11:
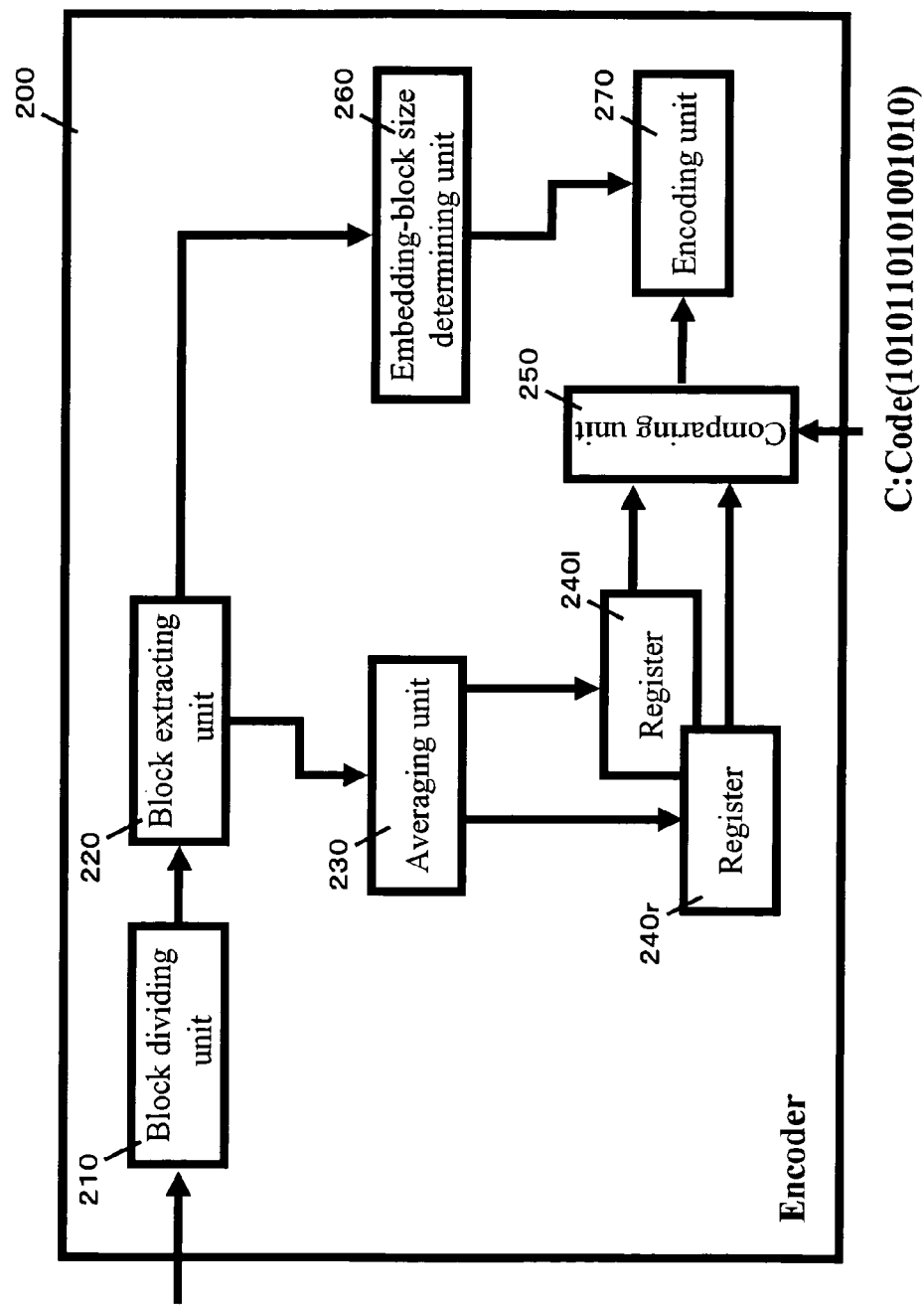
FIG. 11 is a functional block diagram showing the structure of the encoder according to the second embodiment.

Next, a description will be given of the structure of the encoder according to the second embodiment. FIG. 11 is a functional block diagram showing the structure of an encoder 200 according to the second embodiment. Referring to FIG. 11, the encoder 200 comprises: a block dividing unit 210; a block extracting unit 220; an averaging unit 230; registers 240*l* and 240*r*; a comparing unit 250; an embedding-block size determining unit 260; and an encoding unit 270.

Incidentally, the description of the block dividing unit 210, block extracting unit 220, averaging unit 230, registers 240*l* and 240*r*, comparing unit 250, and encoding unit 270 is the same as the description of the block dividing unit 110, block extracting unit 120, averaging unit 130, registers 140*l* and 140*r*, comparing unit 150, and encoding unit 170 as shown in FIG. 2 and this is therefore omitted.

The embedding-block size determining unit 260 is a processing unit that calculates the size of the embedding block on the basis of the resolution and the embedding size of the original image data I0 (refer to FIG. 3). For example, if the resolution of the original image data I0 is 300 dpi and the embedding size is 0.8 mm in square, the size of the embedding block is 9.44 pixels in height and 9.44 pixels in width.

Further, the embedding-block size determining unit 260 compares the block size data obtained from the block extracting unit 220 with the size of the embedding block. And the embedding-block size determining unit 260 determines whether or not the size of the block of the block-divided image data I1 is more than the size of the embedding block.

If the size of the block is more than the size of the embedding block, the embedding-block size determining unit 260 embeds information on the size of the embedding block as data on the size of the embedding block, and sends the information to the encoding unit 270.

Incidentally, if the size of the block is not more than the embedding block, the embedding-block size determining unit 260 changes the size of the embedding block to the size of the block, sets the size of the embedding block after the change, as the data on the size of the embedding block, and sends the set data to the encoding unit 270.

For example, if the size of the embedding block is t in square and the size of the block is w (w<t) in width and h (h<t) in height, the embedding-block size determining unit 260 adjusts the size in width and the size in height of the size of the embedding block to w and h, respectively.

Incidentally, the components of the encoder 200 are mutually connected via a control unit (not shown).

Figure 12A:
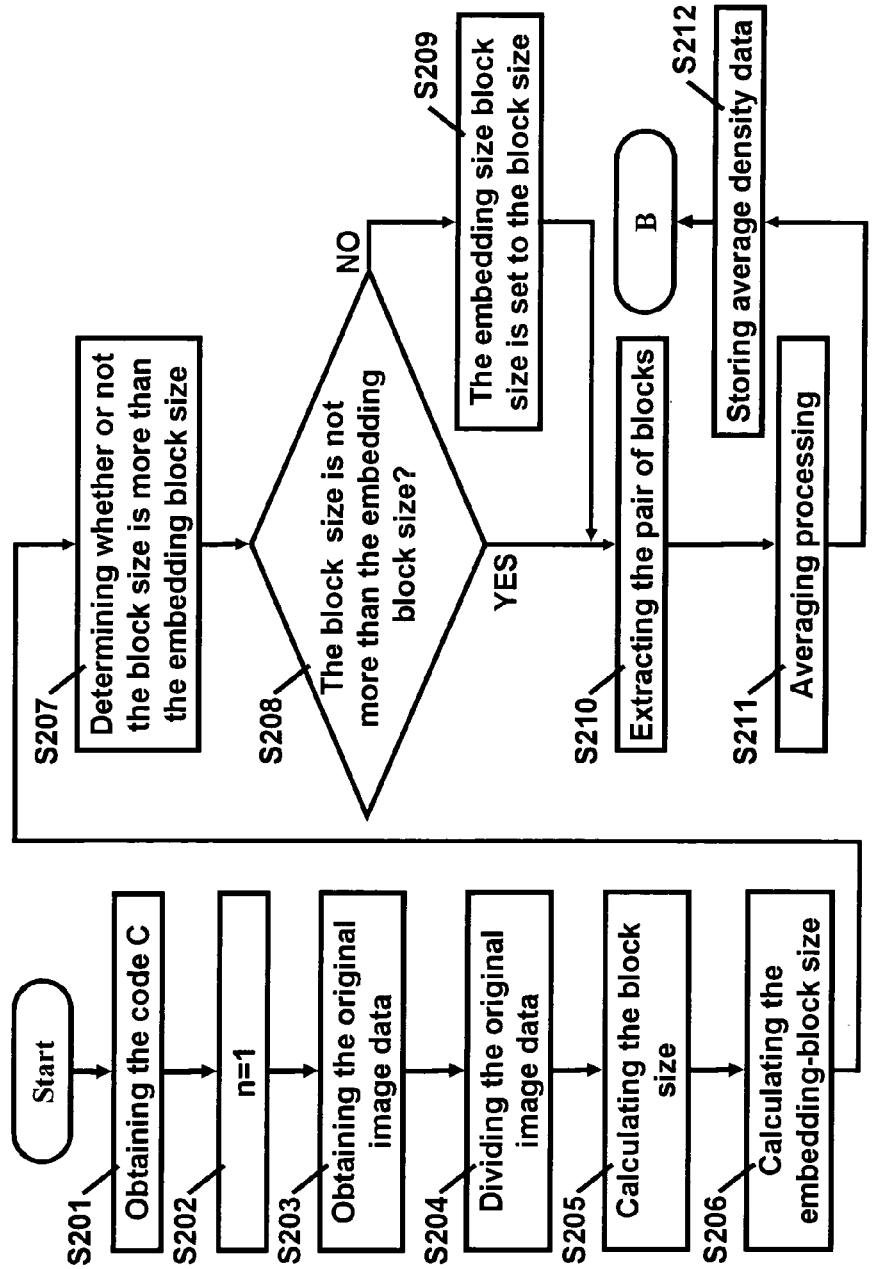
FIGS. 12A and 12B are flowcharts showing a processing sequence of the encoder according to the second embodiment.
Figure 12B:
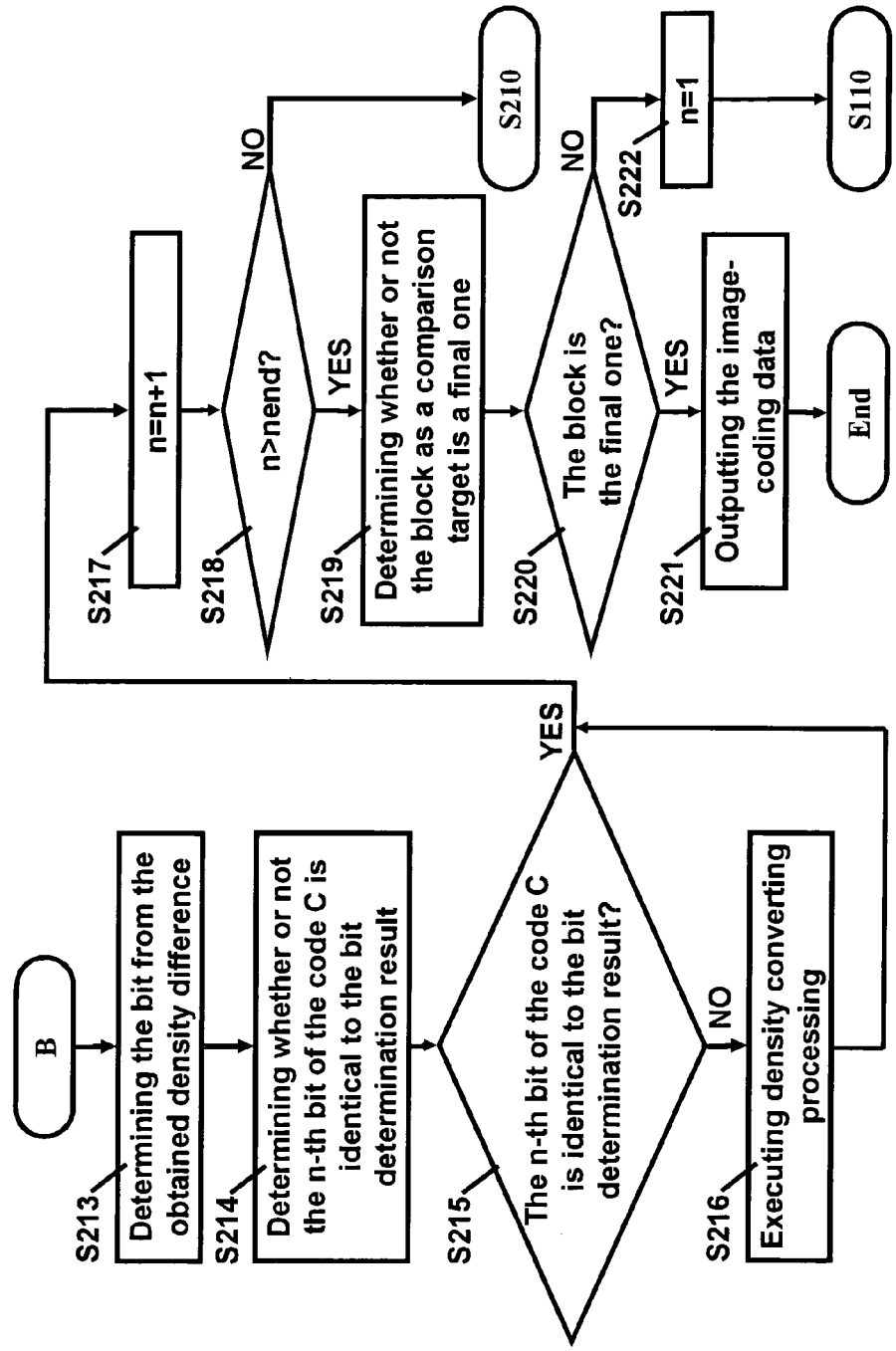

Next, a description will be given of processing of the encoder 200 according to the second embodiment. FIGS. 12A and 12B are flowcharts showing a processing sequence of the encoder 200 according to the second embodiment. Referring to FIGS. 12A and 12B, with the encoder 200, the comparing unit 250 obtains the code C (refer to FIG. 5) (in step S201). And the comparing unit 250 sets n to 1 as the initial value (in step S202). In step S202, n denotes a pointer of the bit of the code C. In this case, n=1 corresponds to the bit "1" of the leftmost of the code C.

Subsequently, the block dividing unit 210 obtains the original image data I0 (refer to FIG. 3) (in step S203). And the block dividing unit 210 divides the original image data I0 input by the block dividing processing (in step S204).

Further, the block dividing unit 210 sends the block-divided image data I1 to the block extracting unit 220. And the block extracting unit 220 calculates the block size. And the block dividing unit 210 sends the calculated block size to the embedding-block size determining unit 260 as the block size data (in step S205).

Subsequently, the embedding-block size determining unit 260 calculates the size of the embedding block (in step S206). The size of the embedding block is an embedding block size. For example, if the resolution of the original image data I0 is 300 dpi and the embedding size is 0.8 mm in square, the embedding block size is 9.44 pixels in height and 9.44 pixels in width (0.8×300/25.4≈9.44).

Further, the embedding-block size determining unit 260 determines whether or not the block size is more than the embedding block size (in step S207). And the block size is the size of block. If the block size is not more than the embedding block size (No in step S208), the embedding block size is set to the block size (in step S209) and the processing shifts to step S210. Each of the embedded blocks has the same size as each of the blocks when the size of each the block is smaller than a predetermined size.

On the other hand, if the block size is more than the size of the embedding block (Yes in step S208), the processing after step S210 is sequentially executed.

The block extracting unit 220 extracts the pair of blocks corresponding to n from the block-divided image data I1. And n equals 1 in the case of the first sequence. In this case the pair of blocks is comprised of blocks $B_{l11}$ and $B_{r11}$. And the block extracting unit 220 thereafter outputs the density distributions of the blocks $B_{l11}$ and $B_{r11}$, as the block density data D, to the averaging unit 230 (in step S210).

The averaging unit 230 obtains the left average density data $D_{l11}$ corresponding to the block $B_{l11}$ and the right average density data $D_{r11}$ corresponding to the block $B_{r11}$ (in step S211) from the block density data D in the case of the first sequence with averaging processing. And the averaging unit 230 registers the left average density data $D_{l11}$ and the right average density data $D_{r11}$ to the resisters 240l and 240r, respectively (in step S212).

The comparing unit 250 obtains "1" as the leftmost bit corresponding to n=1 in the case of the first sequence shown in FIG. 5. And the comparing unit 250 obtains the density difference between the left average density data $D_{l11}$ and the right average density data $D_{r11}$ stored in the registers 240l and 240r. The comparing unit 250 determines the bit on the basis of the density difference (in step S213). And the comparing unit 250 further determines whether or not the bit determination result is identical to the n-th bit of the code C (in step S214).

If the bit determination result is not identical to the n-th bit of the code C (No in step S215), the encoding unit 270 modifies the characteristic value of each of the embedded blocks in accordance with the information to be embedded (in step S216). The encoding unit 270 executes density converting processing for changing the left average density data $D_{lxy}$ and the right average density data $D_{rxy}$ so that the bit determination result based on the size relationship between the left average density data $D_{lxy}$ and the right average density data $D_{rxy}$ is identical to the n-th bit of the code C. Incidentally, the region as the density converting target becomes a region of the embedding block calculated the embedding-block size determining unit 260.

On the other hand, if the n-th bit of the code is identical to the bit determination result (Yes in step S215), the comparing unit 250 increments n by 1 (in step S217). And the comparing unit 250 determines whether or not n is larger than nend. And nend is 16 according to the second embodiment.

If n is not larger than nend (No in step S218), the processing shifts to step S210. If n is more than nend (Yes in step S218), the comparing unit 250 determines whether or not the block as a comparison target is a final one (in step S219). If the block is the final one (Yes in step S220), the encoding unit 270 outputs the image-coding data I3 (in step S221). On the other hand, if the block is not the final one, the comparing unit 250 sets n as 1 (in step S222) and the processing shifts to step S210.

When the size of the embedding block is larger than the size of the block, the embedding-block size determining unit 260 adjusts the size of the embedding block to the size of the block. And the embedding-block size determining unit 260 embeds the code to the original image data I0 depending on the size of the embedding block after the adjustment, thereby efficiently embedding the code even to the original image data I0 with small size.

As mentioned above, with the encoder 200 according to the second embodiment, the block dividing unit 210 divides the original image data I0 into a plurality of blocks. And the embedding-block size determining unit 260 calculates the size of the embedding block on the basis of the resolution and embedding size of the original image data. Further, when the block size is not more than the size of the embedding block, the embedding-block size determining unit 260 adjusts the size of the embedding block to the block size. Furthermore, upon embedding the code to the original image data I0 with the encoding unit 270, the amount of characteristics of the region of the size of the embedding block is operated, thereby embedding the code. Therefore, the code can be precisely embedded even to the original image data I0 with a small size. The small size is original image data having the block size that is smaller than the embedding block.

Figure 13:
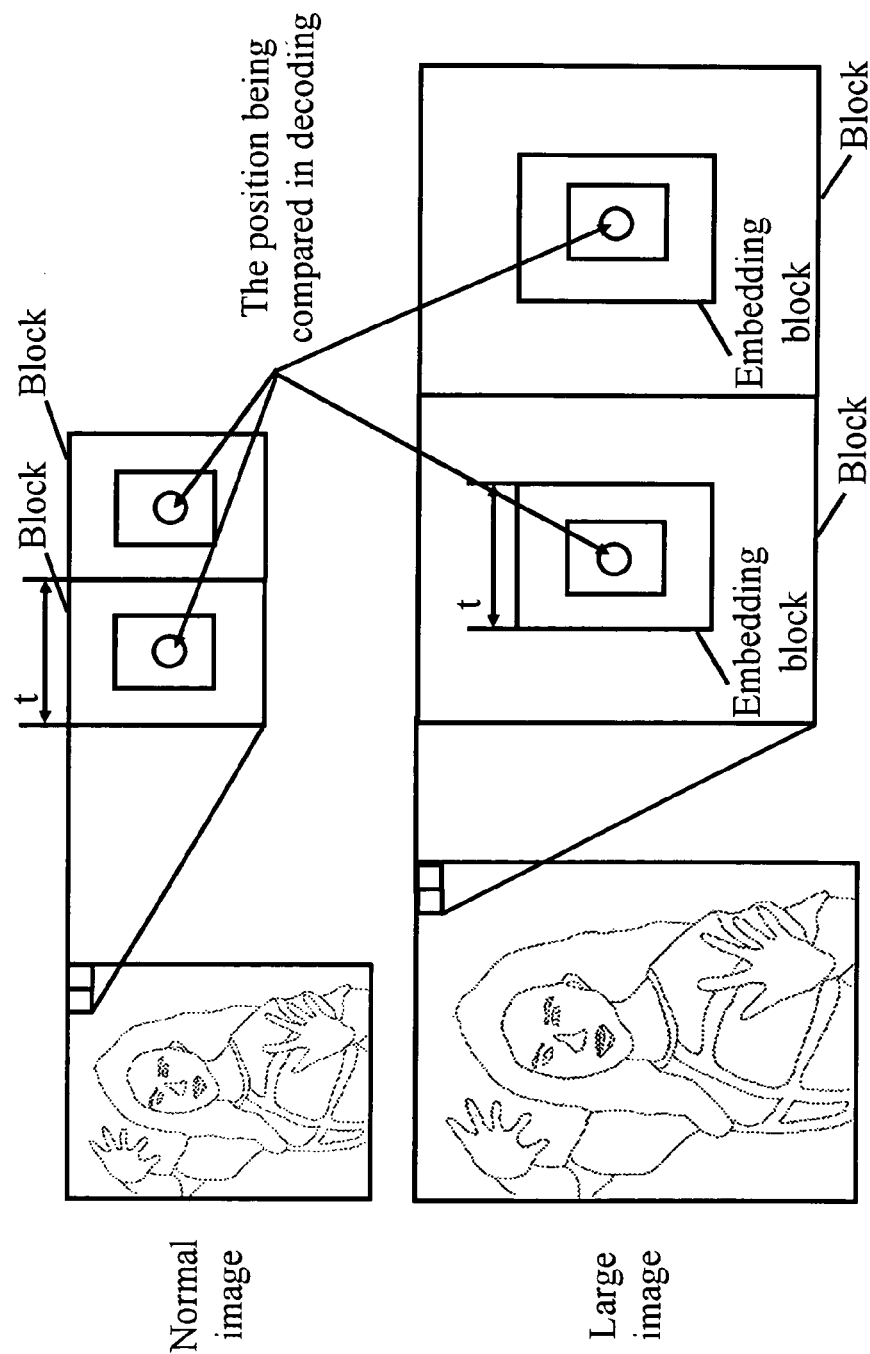
FIG. 13 is an explanatory diagram for illustrating the outline and feature of a decoder according to the third embodiment.

Third Embodiment:

Next, a description will be given of the outline and feature of a decoder according to the third embodiment. FIG. 13 is an explanatory diagram for illustrating the outline and feature of the decoder according to the third embodiment. Referring to FIG. 13, with the decoder according to the third embodiment, upon obtaining the image-coding data I3 as a decoding target, the image-coding data I3 is divided into a plurality of blocks. The image-coding data I3 is refer to FIG. 7 as mentioned according to the first embodiment. And the decoding is executed on the basis of the amount of characteristics of the center portion of the blocks or the pair of blocks.

The decoder according to the third embodiment decodes data on the basis of the amount of characteristics of the central portion that is necessarily included in the embedding block. As a consequence, even upon embedding the data to which the code is embedded with the encoders 100 and 200 as mentioned above according to the first and second embodiments, the data can be properly decoded. Further, the decoding can be efficiently executed irrespective of the image size.

Figure 14:
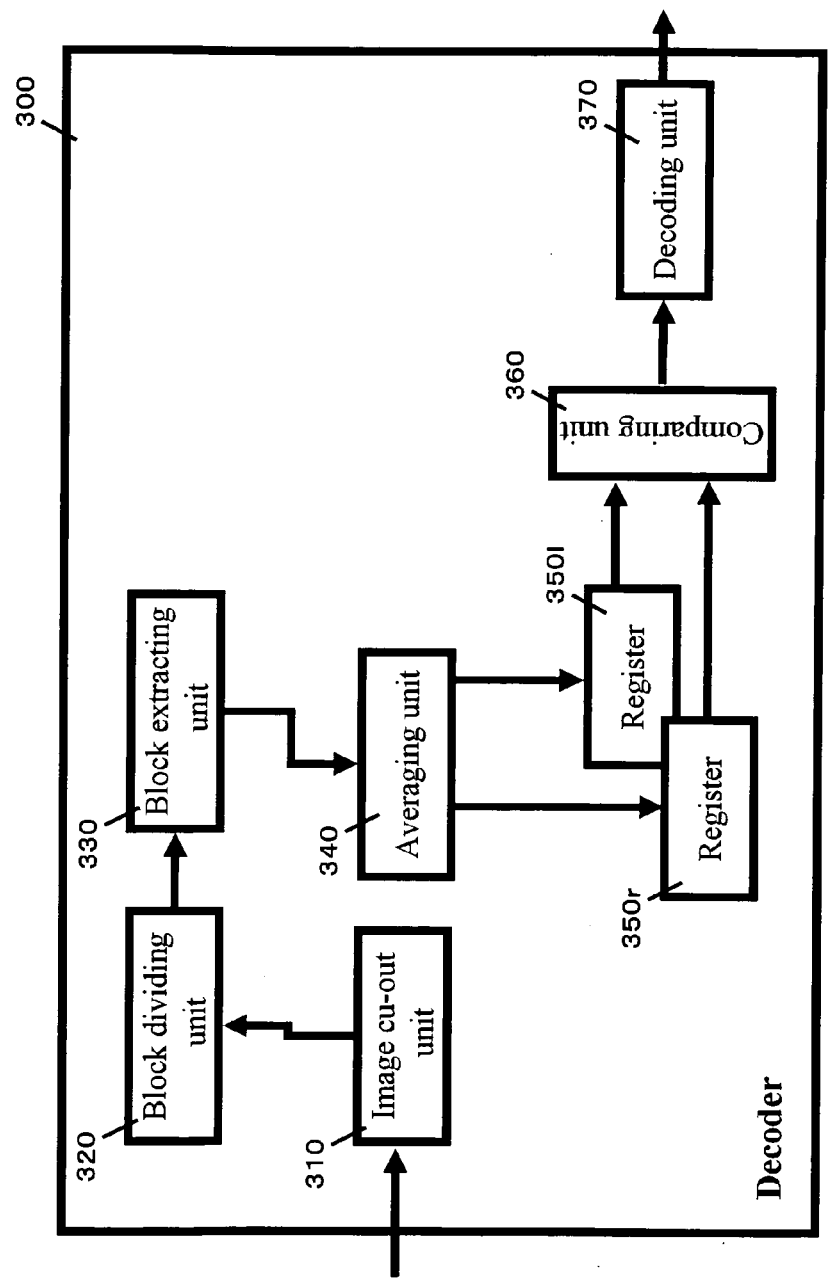
FIG. 14 is a functional block diagram showing the structure of the decoder according to the third embodiment.

Next, a description will be given of the structure of a decoder according to the third embodiment. FIG. 14 is a functional block diagram showing the structure of the decoder according to the third embodiment. Referring to FIG. 14, a decoder 300 comprises: an image cut-out unit 310; a block dividing unit 320; a block extracting unit 330; an averaging unit 340; registers 350*l* and 350*r*; a comparing unit 360; and a decoding unit 370.

The image cut-out unit 310 is a processing unit that cuts-out effectively image-coding data I3 from the whole portion when the periphery of the image-coding data I3, the image-coding data I3 being referred to FIG. 7, includes image data (e.g., margin portion). However, upon inputting only the image-coding data I3 to the image cut-out processing unit 201, the cut-out operation is not performed.

Similarly to the block-divided image data I1 shown in FIG. 4, the block dividing unit 320 is a processing unit that divides the image-coding data obtained from the image cut-out unit 310 into N rows×M columns blocks. In FIG. 4 the block dividing unit 320 divides the image-coding data obtained from the image cut-out unit 310 into 50 rows×40 columns blocks. And the block dividing unit 320 outputs the divided data as the block-divided image data.

The block extracting unit 330 is a processing unit that sequentially extracts the pair of blocks or two blocks from the block-divided image data in accordance with the bit shift. And the block extracting unit 330 sequentially outputs the density distribution of the center portion of each block forming the pair of blocks, as the block density data.

The averaging unit 340 is a processing unit that obtains the left average density data corresponding to a center portion of one of the pair of blocks from the block density data and the right average density data corresponding to a center portion of the other block. And the averaging unit 340 sequentially stores the obtained data to the registers 350*l* and 350*r* in accordance with the bit shift of the code.

The comparing unit 360 is a processing unit that compares the left average density data and the right average density data stored in the registers 350*l* and 350*r* with respect to the size relationship to determine the bit. And the comparing unit 360 outputs a code group CG corresponding to the bit determination result to the decoding unit 370. The bit determination result is determined as the bit as "0" or "1" on the basis of the above-mentioned relational expression The decoding unit 370 determines the code embedded to the image-coding data I3 on the basis of the code group CG output from the comparing unit 360. And the decoding unit 370 outputs the determined code as code C' indicating the decoding result of the decoder 300.

Further, the components of the decoder 300 are mutually connected via a control unit (not shown).

Figure 15A:
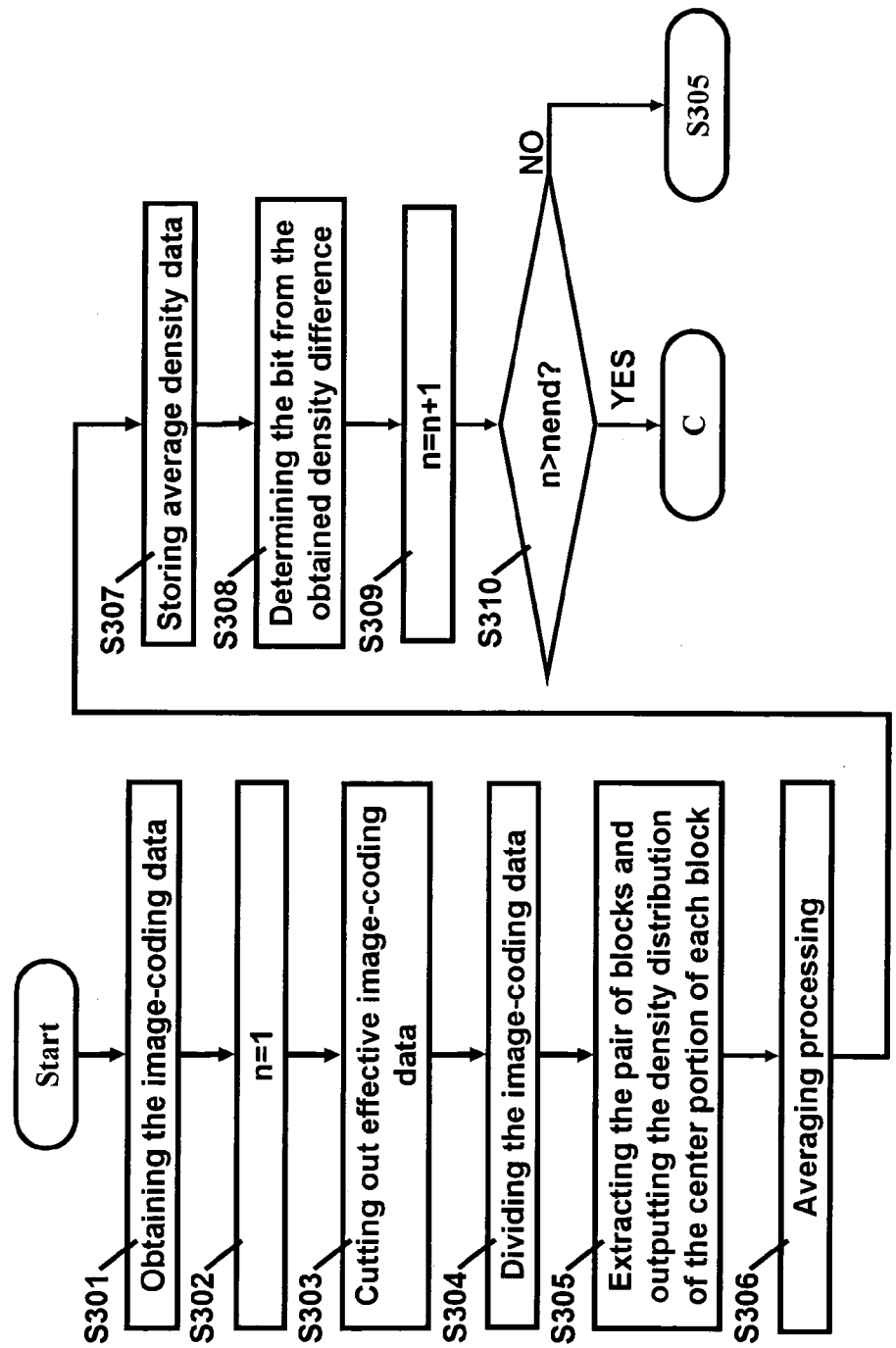
FIGS. 15A and 15B are flowcharts showing a processing sequence of the decoder according to the third embodiment.
Figure 15B:
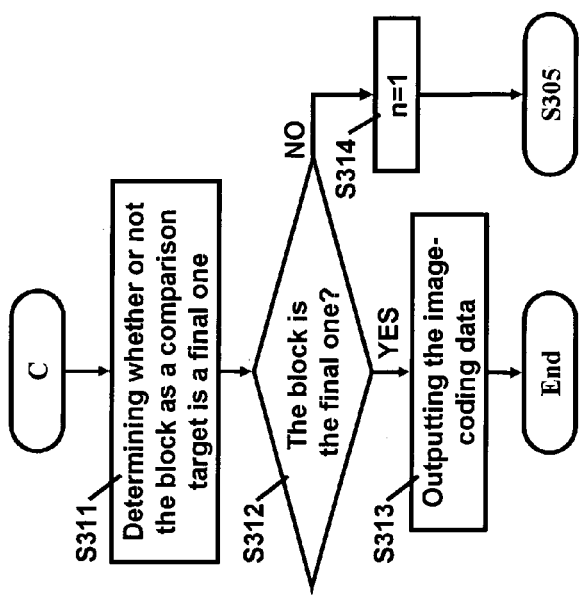

Next, a description will be given of a processing sequence of the decoder 300 according to the third embodiment. FIGS. 15A and 15B are flowcharts showing the processing sequence of the decoder 300 according to the third embodiment. Referring to FIGS. 15A and 15B, the image cut-out unit 310 obtains the image-coding data I3 (in step S301). And the image cut-out unit 310 initializes n to 1 (in step S302). Reference numeral n denotes the pointer of the bit of the code as a decoding target. In this case, n=1 corresponds to the leftmost bit of the code.

Subsequently, when the periphery of the image-coding data I3 includes image data (e.g., a margin portion), the image cut-out unit 310 cuts-out effective image-coding data I3 from the whole portion (in step S303). And the block dividing unit 320 divides the image-coding data I3 into a plurality of blocks and outputs the divided data, as the block-divided image data, to the block extracting unit 330 (in step S304).

The block extracting unit 330 extracts the pair of blocks or two blocks corresponding to n from the block-divided image data. And the block extracting unit 330 thereafter outputs the density distribution of the center portion of each block, as the block density data, to the averaging unit 340 (in step S305).

The averaging unit 340 obtains the left average density corresponding to one block and data and the right average density data corresponding to the other block from the block density data with the averaging processing (in step S305).

And the averaging unit 340 stores the left and right average density data to the registers 350*l* and 350*r*, respectively (in step S307).

The comparing unit 360 compares the left average density data and the right average density data stored in the registers 350*l* and 350*r* with respect to the size relationship. And the comparing unit 360 outputs the bit determination result to the decoding unit 370 (in step S308). The bit determination result is determined as "0" or "1" on the basis of the above-mentioned relational expression. And the comparing unit 360 increments n by 1 (in step S309).

If n is not more than nend (=16) (No in step S310), the processing shifts to step S305. If n is more than nend, the comparing unit 360 determines whether or not the block is the final pair of blocks of the block-divided image data (in step S311).

If the block is the final pair of blocks of the block-divided image data (Yes in step S312), the decoding unit 370 determines code embedded to the image-coding data I3 on the basis of the code group CG obtained from the comparing unit 360. And the decoding unit 370 outputs the determined code C' (in step S313). On the other hand, if the block is not the final pair of blocks of the block-divided image data (No in step S312), 1 is set to n (in step S314). And the processing shifts to step S305.

As mentioned above, the block extracting unit 330 extracts the pair of blocks from the block-divided image data. Thereafter the block extracting unit 330 outputs the density distribution of the center portion of each block forming the pair of blocks, as the block density data, to the averaging unit 340. And the block extracting unit 330 therefore precisely decodes the code embedded to the image-coding data I3.

As mentioned above, with the decoder 300 according to the third embodiment, the block extracting unit 330 sequentially outputs the density distribution of the center portion of each block forming the pair of blocks from the block-divided image data. The averaging unit 340 stores the left average density data and the right average density data to the registers 350*l* and 350*r*. The comparing unit 360 generates the code group CG on the basis of the data stored in the registers 350*l* and 350*r*. And the decoding unit 370 outputs the code C' on the basis of the code group CG. Therefore, even upon embedding the code with the encoder described according to the first and second embodiments, the decoding can be properly executed. Further, irrespective of the image size, the decoding can be efficiently executed.

Figure 16:
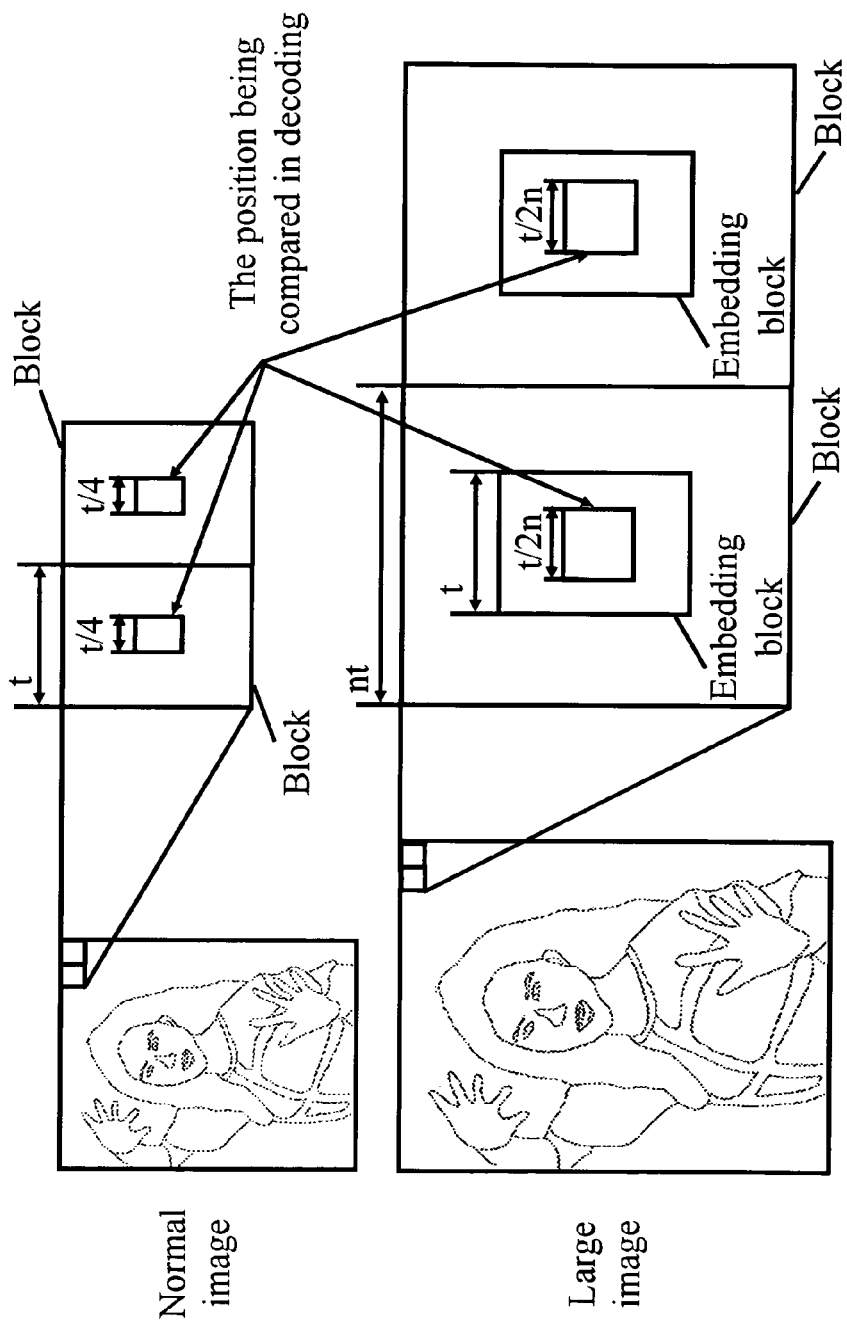
FIG. 16 is an explanatory diagram for illustrating the outline and feature of a decoder according to the fourth embodiment.

Fourth Embodiment:

Next, a description will be given of the outline and feature of a decoder according to the fourth embodiment. FIG. 16 is an explanatory diagram for illustrating the outline and feature of the decoder according to the fourth embodiment. Referring to FIG. 16, the decoder according to the fourth embodiment calculates the decoding range on the basis of the size of the image-coding data I3. And the decoder executes the decoding within the calculated decoding range. Hereinafter, the decoding range is simply expressed as a decoding range.

For example, in the case of a normal image, the normal image having the size of the divided block (block in t-square) identical to the size of the embedding block, the decoding range is t/4-square. In the case of a large image, the large image having a divided block (nt in square) more than the embedding block, the decoding range is t/2n in square. And n is a positive number.

As mentioned above, the decoder according to the fourth embodiment calculates the decoding range on the basis of the size of the image-coding data I3. And the decoder executes the decoding on the basis of the calculated decoding range, thereby maximally using the encoded pixel. Further, the decoding precision can be improved.

Figure 17:
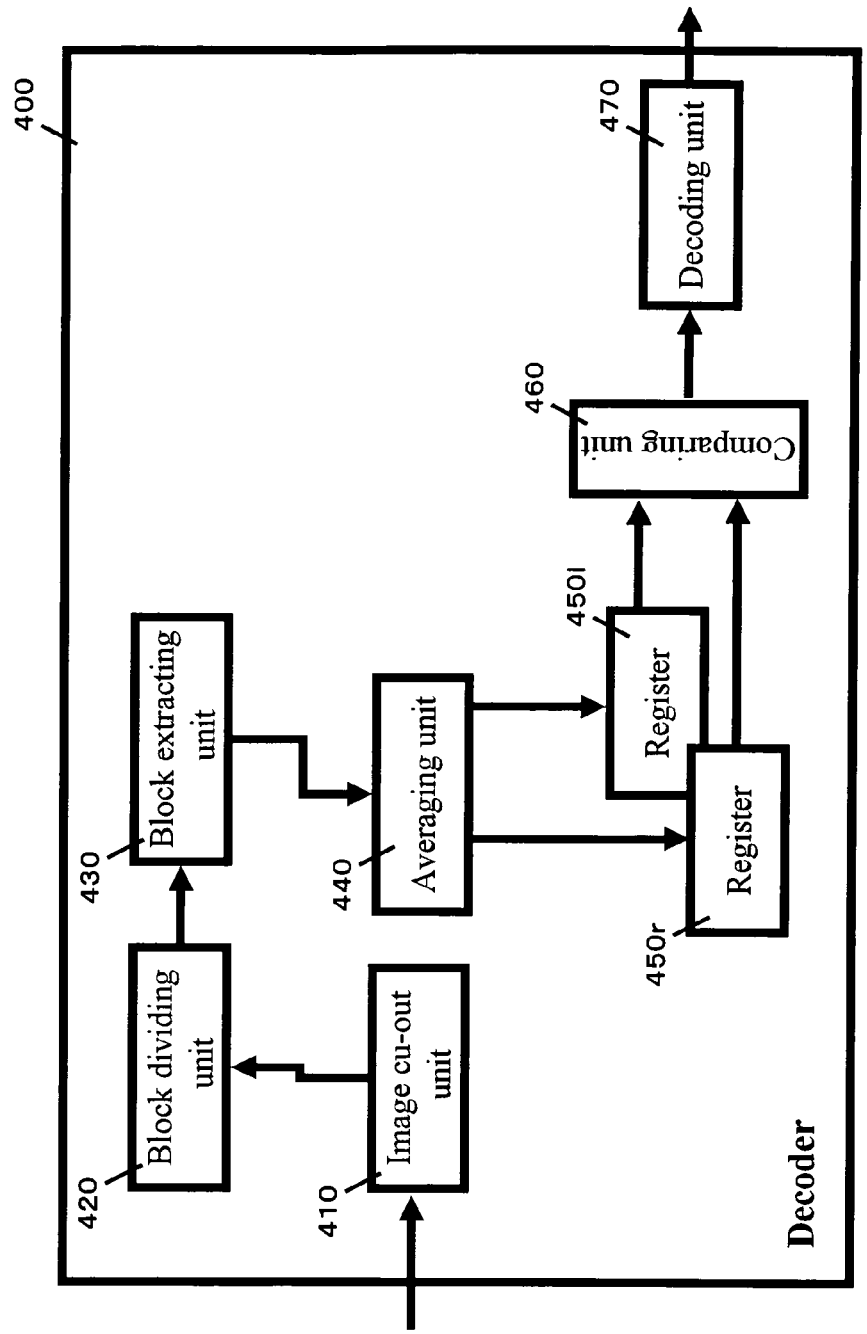
FIG. 17 is a functional block diagram showing the structure of the decoder according to the fourth embodiment.

Next, a description will be given of the structure of a decoder according to the fourth embodiment. FIG. 17 is a functional block diagram showing the structure of the decoder according to the fourth embodiment. Referring to FIG. 17, a decoder 400 comprises: an image cut-out unit 410; a block dividing unit 420; a block extracting unit 430; an averaging unit 440; registers 450*l* and 450*r*; a comparing unit 460; and a decoding unit 470.

Incidentally, a description of the image cut-out unit 410, block dividing unit 420, averaging unit 440, registers 450*l* and 450*r*, comparing unit 460, and decoding unit 470 is similar to that of the image cut-out unit 310, block dividing unit 320, averaging unit 340, registers 350*l* and 350*r*, comparing unit 360, and decoding unit 370 as shown in FIG. 14 and it is therefore omitted.

The block extracting unit 430 is a processing unit that sequentially extracts the pair of blocks or two blocks from the block-divided image data in accordance with the bit shift. And the block extracting unit 430 sequentially outputs, as the block density data, the density distribution within the decoding range of each block forming the pair of blocks.

Incidentally, the block extracting unit 430 calculates the decoding range on the basis of the size of the block of the block-divided image data obtained from the block dividing unit 420. For example, in the case of using the image having the double size of the normal image, if the size of the block is t in square, the decoding range is t/4 in square. Further, in the case of using the image having n times of the normal image, the decoding range is t/2n in square. And n is a positive number.

Although the block extracting unit 430 calculates the decoding range on the basis of the block size of the block-divided image data as an example, the embodiment is not limited to this. If obtaining the data on the size of the embedding block from the encoder according to the first embodiment or the second embodiment, the decoding range can be calculated on the basis of the size of the embedding block. For example, if the size of the embedding block is s in square, the block extracting unit 430 sets the decoding range as s/4.

Incidentally, the components of the decoder 300 are mutually connected via a control unit (not shown).

Figure 18A:
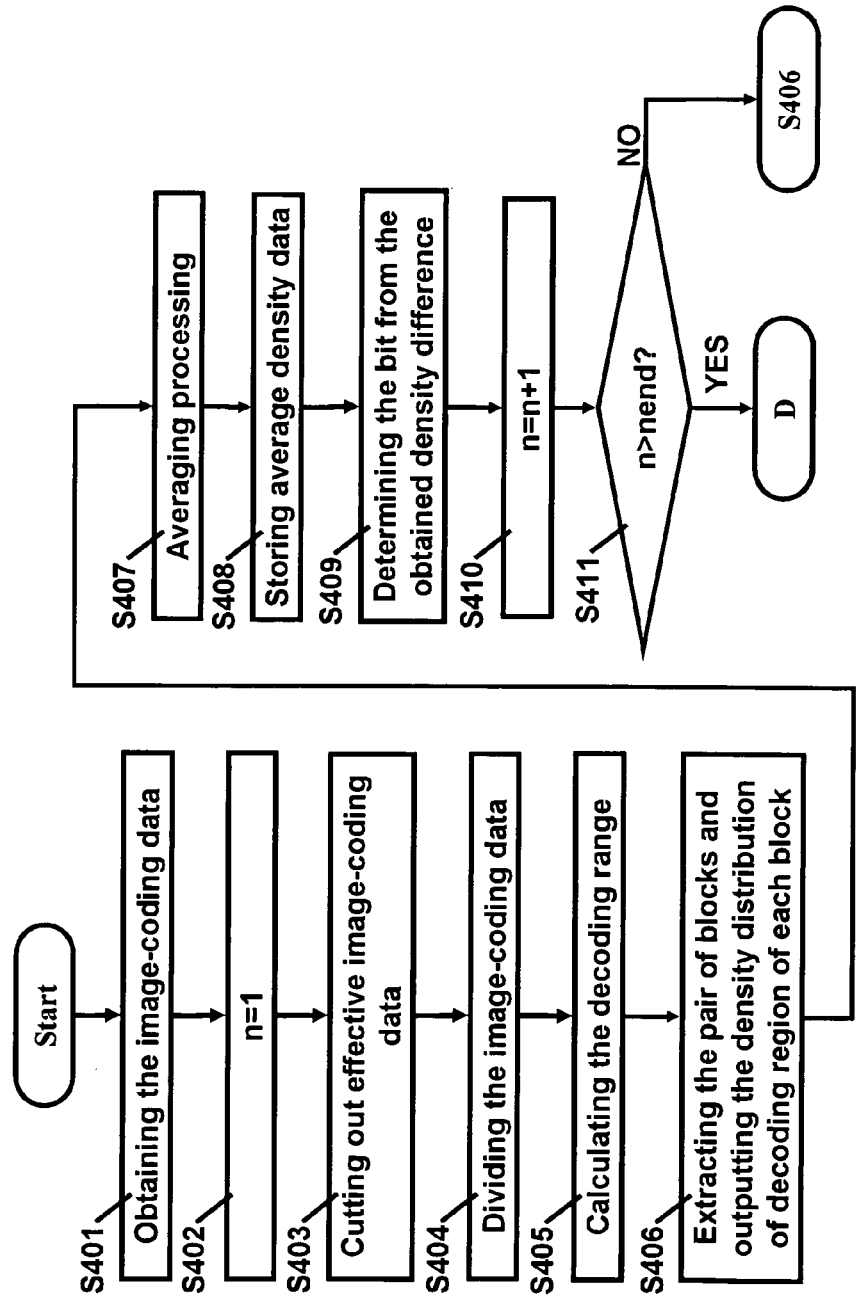
FIGS. 18A and 18B are flowcharts showing a processing sequence of the decoder according to the fourth embodiment.
Figure 18B:
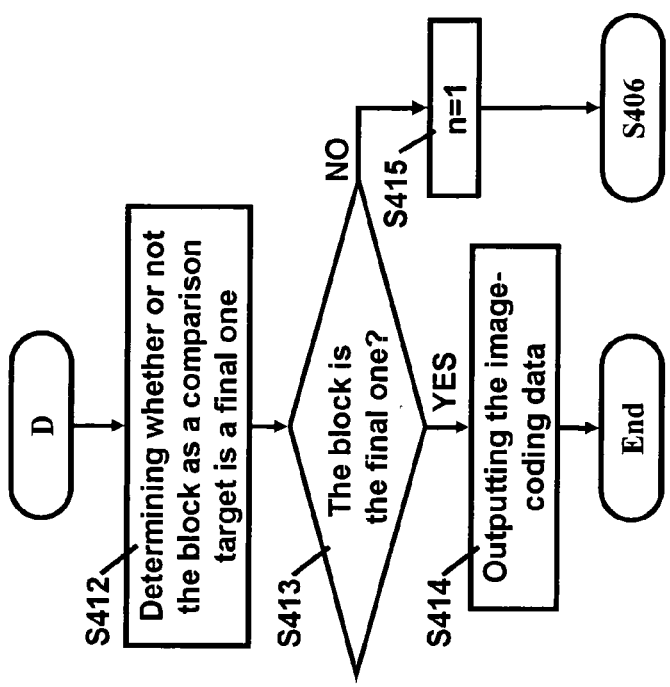

Next, a description will be given of a processing sequence of the decoder 400 according to the fourth embodiment. FIGS. 18A and 18B are flowcharts showing the processing sequence of the decoder 400 according to the fourth embodiment. Referring to FIGS. 18A and 18B, the image cut-out unit 410 obtains the image-coding data I3 (in step S401), and initializes n to 1 (in step S402). Reference numeral n denotes the pointer of the bit of the code as the decoding target. In this case, n=1 corresponds to the leftmost bit of the code.

Subsequently, if the periphery of the image-coding data I3 includes image data (e.g., a margin portion), the image cut-out unit 410 cuts-out effective image-coding data I3 (in step S403). The block dividing unit 420 divides the image-coding data I3 into a plurality of blocks. And the block dividing unit 420 outputs the divided data, as the block-divided image data, to the block extracting unit 430 (in step S404).

Further, the block extracting unit 430 calculates the decoding range on the basis of the size of the block of the block-divided image data (in step S405). The block extracting unit 430 extracts the pair of blocks or two blocks corresponding to n from the block-divided image data. And the block extracting unit 430 thereafter outputs the density distribution of the decoding region of each block, as the block density data, to the averaging unit 440 (in step S406).

The averaging unit 440 obtains the left average density data corresponding to one block and the right average density data corresponding to the other block from the block density data with the averaging processing (in step S407). And the averaging unit 440 stores the left average density data and the right average density data to the registers 450*l* and 450*r*, respectively (in step S408). The comparing unit 460 compares, with respect to the size relationship, the left average density data and the right average density data stored in the registers 450*l* and 450*r*. And the comparing unit 460 thereby determines the bit. Further, the comparing unit 460 outputs the bit determination result (of determining the bit as "0" or "1" on the basis of the relational expression) to the decoding unit 470 (in step S409), and increments n by 1 (in step S410)

Further, if n is no more than nend (=16) (No in step S411), the processing shifts to step S406. If n is more than nend, the comparing unit 460 determines whether or not the block is the final pair of blocks of the block-divided image data (in step S412).

If the block is the final pair of blocks of the block-divided image data (Yes in step S413), the decoding unit 470 determines the code embedded to the image-coding data I3 on the basis of the code group CG obtained from the comparing unit 460. And the decoding unit 470 outputs the determined code C' (in step S414). On the other hand, if the block is the final pair of block of the block-divided image data (No in step S413), 1 is set to n (in step S415). And the processing shifts to step S406.

As mentioned above, the block extracting unit 430 calculates the decoding range. The block extracting unit 430 extracts the pair of blocks from the block-divided image data, and outputs, as the block density data, the density distribution within the decoding range of each block forming the pair of blocks to the averaging unit 440. The code embedded to the image-coding data I3 can be precisely decoded.

As mentioned above, with the decoder 400 according to the fourth embodiment, the block extracting unit 430 calculates the decoding range. The block extracting unit 430 sequentially outputs, as the block density data, the density distribution within the decoding range of each block forming the pair of blocks of the block-divided image data. Further, the averaging unit 440 stores the left average density data and the right average density data to the registers 450*l* and 450*r*. Furthermore, the comparing unit 460 generates the code group CG on the basis of the data stored in the registers 450*l* and 450*r*. And the decoding unit 470 outputs the code C' on the basis of the code group CG. Therefore, the encoded pixel can be maximally used and the decoding precision can be improved.

According to the first to fourth embodiments, the code is embedded to the image data by setting the average density of the image as the amount of characteristics. However, the embodiment is not limited to this, and the code may be embedded by setting, as the amount of characteristics, the granularity, the saturation, the center of gravity of density, or distribution.

Further, the embedding size of the amount of characteristics according to the first to fourth embodiments is determined depending on the characteristics of the eye of the human being. Therefore, in the case of a pamphlet or magazine, the distance from the eye to the screen is approximately 20 cm. On the other hand, in the case of a poster, the distance is long and the embedding size is therefore larger. As a consequence, a value of the embedding size is not limited to a constant value. The embedding size is 0.8 mm in square according to the first embodiment and however the embodiment is not limited to this.

Further, the position for changing the amount of characteristics of the block on the block-divided image data may be anywhere within the block and may be alternatively distributed to various ones. As mentioned above, the influence of the image deterioration can be suppressed by distributing the position for changing the amount of characteristics.

Incidentally, the processing of the encoders 100 and 200 and the decoders 300 and 400 described according to the first to fourth embodiments can be realized by executing a prepared program by a computer. Hereinbelow, a description will be given of an example of the computer that executes the processing for realizing various processing with reference to FIG. 19.

Figure 19:
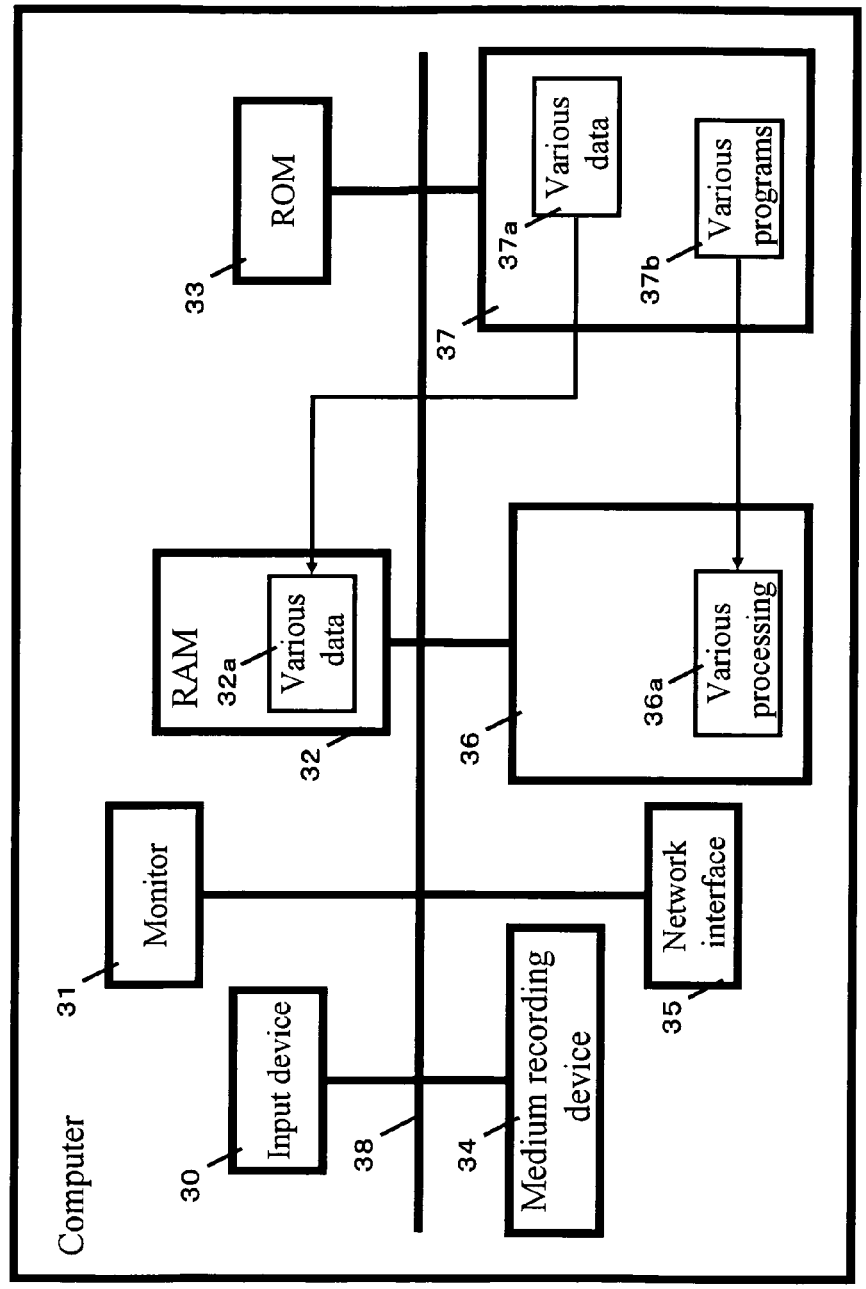
FIG. 19 is a diagram showing the hardware structure of a computer forming the encoder and the decoder shown in FIGS. 2, 11, 14, and 17.

FIG. 19 is a diagram showing the hardware structure of the computer forming the encoders 100 and 200 and the decoders 300 and 400 shown in FIGS. 2, 11, 14, and 17. The computer comprises: an input device 30 that receives data from a user; a monitor 31; a RAM (Random Access Memory) 32; a ROM (Read Only memory) 33; a medium reading device 34 that reads a program from a recording medium for recording various programs; a network interface 35 that receives and sends the data to/from another computer via a network; a CPU (Central Processing Unit) 36 (or MCU (Micro Controller Unit); an MPU (Micro Processing Unit); and an HDD (Hard Disk Drive) 37 that are connected via a bus 38.

Further, when the computer corresponds to the encoders 100 and 200, the HDD 37 stores various programs 37*b* that exhibit the same functions as those of the encoders 100 and 200. Furthermore, the CPU 36 reads the various programs 37*b* from the HDD 37 and executes the programs, thereby starting various processing 36*a* that realizes functions of the functions of the encoders 100 and 200. The various processing 36*a* corresponds to the block dividing units 110 and 210, the block extracting units 120 and 220, the averaging units 130 and 230, the registers 140*l*, 140*r*, 240*l*, and 240*r*, the comparing units 150 and 250, the embedding-block size determining units 160 and 260, and the encoding units 170 and 270, as shown in FIGS. 2 and 11.

Incidentally, when the computer corresponds to the decoders 300 and 400, the HDD 37 stores the various programs 37*b* that exhibit the same functions as those of the decoders 300 and 400. Further, the CPU 36 reads the various programs 37*b* from the HDD 37. The CPU 36 executes the various programs 37*b*, thereby starting the various processing 36*a* that realizes the functions of the functional units of the decoders 300 and 400. The various processing 36*a* corresponds to the image cut-out units 310 and 410, the block dividing units 320 and 420, the block extracting units 330 and 430, the averaging units 340 and 440, the registers 350*l*, 350*r*, 450*l*, and 450*r*, the comparing units 360 and 460, and the decoding units 370 and 470, as shown in FIGS. 14 and 17.

Further, the HDD 37 stores various data 37*a* corresponding to the data (e.g., image data) stored in the storing units in the encoders 100 and 200 and the decoders 300 and 400. The CPU 36 stores the various data 37*a* to the HDD 37 and furthermore reads the various data 37*a* from the HDD 37, stores the read data to the RAM 32, and executes data processing on the basis of the various data 32*a* stored in the RAM 32.

The various programs 37*b* do not need to be stored to the HDD 37 from the first time. For example, the computer may store the various programs 37*b* in advance to a "movable physical medium" such as a flexible disk (FD), a CD-ROM, a DVD disk, a magneto-optical disk, and an IC card, which are inserted into the computer, a "fixing physical medium" such as a hard disk drive (HDD), which is provided inside/outside the computer, or "another computer (or server)" connected to the computer via a public line, Internet, LAN (Local Area Network), and WAN (Wide Area Network), and may further read and execute the various programs 37*b*.

The embodiments are described above. They can be embodied within the range of the technological essentials described in claims.

Further, of the processing described according to the embodiments, all or a part of the processing automatically-performed can be manually executed. Alternatively, all or a part of the processing manually-performed can be also automatically executed by a well-known method.

In addition, the processing sequences, control sequence, and specific names, and information including various and parameters, shown in the document and drawings can be arbitrarily changed, excluding the special note.

In addition, the components of the devices shown in the drawings are conceptual in function and do not need to be physically formed as shown in the drawings. That is, the specific forms of distribution and integration of the devices are not limited to those shown in the drawings' and all or a part of them can be functionally or physically distributed and integrated on the basis of an arbitrary unit in accordance with various loads and using situations.

In addition, all or an arbitrary part of the processing functions of the devices can be realized by the CPU or a program analyzed and executed by the CPU and can be alternatively realized as hardware of wired logic.

As mentioned above, an image processing apparatus, a printing matter, and an image processing program according to the embodiments are advantageous for a system for embedding information to image data and, in particular, are suitable to the case of embedding the information to the image while keeping a constant image quality irrespective of the size of the image data.

According to the embodiment, the image is divided into a plurality of blocks and the size of the block is calculated. The size of the embedding block indicating the region for embedding the information is calculated from among the pair of blocks of the plurality of blocks on the basis of the size of the image. The size relationship of the amount of characteristics included in the pair of blocks is operated. The information is embedded to the image on the basis of the size of the embedding block. Therefore, the image deterioration upon embedding the information to the image can be minimally suppressed. Further, the information embedding can be executed while keeping an image quality at a predetermined level or more to image data with any sizes. Therefore, the information can be embedded to the image with various sizes desired by a user, thereby improving the convenience.

The invention claimed is:

1. A method of embedding information into an image, by a computer, the method comprising:
   dividing, by the computer, the image into a plurality of blocks;
   providing a plurality of embedded blocks corresponding to the plurality of blocks, respectively, each of the embedded blocks having a same size as each of the blocks when each of the blocks is smaller than a predetermined physical fixed-size, each of the embedded blocks having the predetermined physical fixed-size and being placed at a center of each block when each of the blocks is not smaller than the predetermined physical fixed-size; and
   selectively modifying a characteristic value of each of the embedded blocks based on a determination as to a set size of the embedded block in accordance with the providing such that the information is embedded into the image where one of an amount of characteristic of a block at a left of an area corresponding to a size of an embedded block becomes more than an amount of characteristic of a block at a right of the area corresponding to the set size of the embedded block, and the amount of characteristic of the block at the right of the area corresponding to a size of the embedded block becomes more than the amount of characteristic of the block at the left of the area corresponding to the set size of the embedded block.

2. The method of claim 1, wherein the modifying modifies the characteristic value of the embedded blocks when each the block is not smaller than the predetermined physical fixed-size.

3. The method of claim 1, wherein the modifying outputs an error when the size of each the block is smaller than the predetermined physical fixed-size.

4. The method of claim 1, wherein the modifying modifies the characteristic value of the embedded blocks when the size of each the block is smaller than the predetermined physical fixed-size.

5. The method of claim 1, wherein the characteristic value is an average density, a granularity, a saturation, a center of gravity of density or a distribution.

6. A method of obtaining information included in an image by a computer, the image comprising a plurality of blocks, the method comprising:
   detecting, by the computer, a plurality of embedded blocks, each of the embedded blocks being placed at a center of each the plurality of blocks;
   obtaining a characteristic value of a center area of the embedded block; and
   obtaining information based on the characteristic value of the center area of the embedded block and adjusting the characteristic value based on a determination made as to a set size of an embedded block such that the information is embedded into the image where one of an amount of characteristic of a block at a left of an area corresponding to a size of an embedded block becomes more than an amount of characteristic of a block at a right of the area corresponding to the set size of the embedded block, and the amount of characteristic of the block at the right of the area corresponding to the size of the embedded block becomes more than the amount of characteristic of the block at the left of the area corresponding to the set size of the embedded block.

7. The method of claim 6, further comprising repeating, by the computer, the obtaining the characteristic value of the center area in other embedded blocks.

8. The method of claim 6, wherein the obtaining obtains the information on the basis of the characteristic value of the center area of the embedded block between adjacent blocks.

9. The method of claim 6, wherein the characteristic value is an average density, a granularity, a saturation, a center of gravity of density or a distribution.

10. An apparatus for controlling to control a process of embedding information into an image, the apparatus comprising:
    a processor coupled to a memory, configured to execute:
       dividing the image into a plurality of blocks,
       providing a plurality of embedded blocks corresponding to the plurality of blocks, respectively, each of the embedded blocks having a same size as each of the blocks when each of the blocks is smaller than a predetermined physical fixed-size, each of the embedded blocks having the predetermined size and being placed at a center of each the block when each of the blocks is not smaller than the predetermined physical fixed-size, and
       selectively modifying a characteristic value of each of the embedded blocks based on a determination as to a set size of the embedded block in accordance with the providing such that the information is embedded into the image where one of an amount of characteristic of a block at a left of an area corresponding to a size of an embedded block becomes more than an amount of characteristic of a block at a right of the area corresponding to the set size of the embedded block, and the amount of characteristic of the block at the right of the area corresponding to the set size of the embedded block becomes more than the amount of characteristic of the block at the left of the area corresponding to the set size of the embedded block.

11. The apparatus of claim 10, wherein the processor is configured to modify the characteristic value of the embedded blocks when each the block is not smaller than the predetermined physical fixed-size.

12. The apparatus of claim 10, wherein the processor is configured to output an error when the size of each the block is smaller than the predetermined physical fixed-size.

13. The apparatus of claim 10, wherein the processor is configured to modify the characteristic value of the embedded blocks when the size of each the block is smaller than the predetermined physical fixed-size.

14. The apparatus of claim 10, wherein the characteristic value is an average density, a granularity, a saturation, a center of gravity of density or a distribution.

15. The method of claim 1, comprising
    comparing a size of at least a block of the plurality of blocks to a size of at least an embedded block of the plurality of embedded blocks having the predetermined size, the comparing determining that:
       when the size of the block is smaller than the predetermine size of the embedded block, the size of the embedded block is adjusted to have the size of the block, and
       when the size of the block is not smaller than the predetermined size of the embedded block, the embedded block maintains the predetermined size and the embedded block is placed at a center of the block, and wherein the characteristic value of each of the embedded blocks is modified in association with the comparing.

16. The method of claim 6, comprising comparing a size of at least a block of the plurality of blocks to a size of at least an embedded block of the plurality of embedded blocks having the predetermined size, the comparing determining that:

when the size of the block is smaller than the predetermine size of the embedded block, the size of the embedded block is adjusted to have the size of the block, and when the size of the block is not smaller than the predetermined size of the embedded block, the embedded block maintains the predetermined size and the embedded block is placed at a center of the block, and wherein the characteristic value of each of the embedded blocks is adjusted in association with the determination based on the comparing.

17. The apparatus of claim 10, comprising comparing a size of at least a block of the plurality of blocks to a size of at least an embedded block of the plurality of embedded blocks having the predetermined size, the comparing determining that:

when the size of the block is smaller than the predetermine size of the embedded block, the size of the embedded block is adjusted to have the size of the block, and when the size of the block is not smaller than the predetermined size of the embedded block, the embedded block maintains the predetermined size and the embedded block is placed at a center of the block, and wherein the characteristic value of each of the embedded blocks is modified in association with the comparing.

\* \* \* \* \*

UNITED STATES PATENT AND TRADEMARK OFFICE
CERTIFICATE OF CORRECTION

PATENT NO. : 8,520,264 B2
APPLICATION NO. : 12/007365
DATED : August 27, 2013
INVENTOR(S) : Jun Moroo et al.

It is certified that error appears in the above-identified patent and that said Letters Patent is hereby corrected as shown below:

In the Claims

In Col. 18, Line 13, In Claim 10, after "apparatus" delete "for controlling".

Signed and Sealed this
Tenth Day of December, 2013

Margaret A. Focarino
*Commissioner for Patents of the United States Patent and Trademark Office*